(12) United States Patent
Tusi et al.

(10) Patent No.: US 11,309,947 B2
(45) Date of Patent: Apr. 19, 2022

(54) SYSTEMS AND METHODS FOR MAINTAINING DIRECTIONAL WIRELESS LINKS OF MOTILE DEVICES

(71) Applicant: Facebook Technologies, LLC, Menlo Park, CA (US)

(72) Inventors: Reza Tusi, San Jose, CA (US); Ohad Meitav, Sunnyvale, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/195,833

(22) Filed: Nov. 19, 2018

(65) Prior Publication Data

US 2020/0162140 A1 May 21, 2020

(51) Int. Cl.
| | |
|---|---|
| H04B 7/06 | (2006.01) |
| H01Q 1/27 | (2006.01) |
| H01Q 3/28 | (2006.01) |
| H04W 16/28 | (2009.01) |
| H04N 5/225 | (2006.01) |
| H04N 13/332 | (2018.01) |
| H01Q 21/00 | (2006.01) |

(52) U.S. Cl.
CPC ........... *H04B 7/0617* (2013.01); *H01Q 1/273* (2013.01); *H01Q 3/28* (2013.01); *H01Q 21/0025* (2013.01); *H04B 7/0691* (2013.01); *H04N 5/2253* (2013.01); *H04N 13/332* (2018.05); *H04W 16/28* (2013.01)

(58) Field of Classification Search
CPC ...... H04B 7/0617; H04B 7/0691; H01Q 3/28; H01Q 21/0025; H01Q 1/273; H04W 16/28; H04N 13/332; H04N 5/2253
See application file for complete search history.

(56) References Cited

U.S. PATENT DOCUMENTS 8,649,565 B1 * 2/2014 Kim ................... G06K 9/6292
 382/106
9,503,628 B1 * 11/2016 Alsalamah ......... H04N 5/23203
(Continued)

FOREIGN PATENT DOCUMENTS

WO WO-2017099077 A1 6/2017

OTHER PUBLICATIONS

Rohde & Schwarz, "802.11ad—WLAN at 60 GHz a Technology Introduction White Paper", Nov. 17, 2017, 29 pages.
Singh et al., "Trends in Adaptive Array Processing", International Journal of Antennas and Propagation, vol. 2012, Article ID 361768, May 13, 2011, pp. 1-20.
(Continued)

*Primary Examiner* — Ryan R Yang
(74) *Attorney, Agent, or Firm* — FisherBroyles, LLP

(57) ABSTRACT

The disclosed computer-implemented method may include (1) establishing a directional wireless link between a first computing device and a second computing device in a first direction, (2) exchanging, over the directional wireless link in the first direction, first data between the first computing device and the second computing device, (3) determining, via a sensor of the first computing device, a change to a position or an orientation of the first computing device, (4) redirecting, based on the change, the directional wireless link to a second direction, and (5) exchanging, over the directional wireless link in the second direction, second data between the first computing device and the second computing device. Various other methods and systems are also disclosed.

20 Claims, 16 Drawing Sheets

(56) References Cited

U.S. PATENT DOCUMENTS

| | | | |
|---|---|---|---|
| 9,715,609 B1* | 7/2017 | Fink | G06K 7/10366 |
| 9,866,286 B1* | 1/2018 | Qu | H04B 7/0408 |
| 9,948,413 B1* | 4/2018 | Zhou | H04B 7/0619 |
| 10,061,352 B1 | 8/2018 | Trail | |
| 2011/0149798 A1* | 6/2011 | Cordeiro | H04W 8/005 |
| | | | 370/254 |
| 2014/0062854 A1* | 3/2014 | Cho | G06F 3/017 |
| | | | 345/156 |
| 2015/0382145 A1* | 12/2015 | Smith | H04W 4/02 |
| | | | 455/456.3 |
| 2016/0141753 A1* | 5/2016 | Liou | H01Q 1/273 |
| | | | 455/78 |
| 2017/0010100 A1* | 1/2017 | Takeuchi | G05D 1/0272 |
| 2017/0026098 A1* | 1/2017 | Maltsev | H04L 5/0053 |
| 2017/0064748 A1* | 3/2017 | Cai | H04W 76/10 |
| 2017/0067739 A1* | 3/2017 | Siercks | G06T 7/0004 |
| 2018/0009526 A1* | 1/2018 | Spengler | B64C 39/024 |
| 2018/0095529 A1 | 4/2018 | Tokubo | |
| 2018/0124497 A1 | 5/2018 | Boesen | |
| 2018/0259778 A1 | 9/2018 | Pu et al. | |
| 2018/0287679 A1* | 10/2018 | Onishi | H04B 7/0617 |
| 2018/0309500 A1* | 10/2018 | Qu | H04B 7/15528 |
| 2018/0357980 A1 | 12/2018 | Miyazaki | |
| 2019/0012799 A1* | 1/2019 | Tsurumi | G02B 27/0172 |
| 2019/0158156 A1* | 5/2019 | Da Silva | H04B 7/0421 |
| 2019/0213754 A1* | 7/2019 | Lee | G06T 7/60 |
| 2019/0214709 A1* | 7/2019 | Frishman | H01Q 21/205 |
| 2019/0236797 A1* | 8/2019 | Thyagharajan | G06T 7/579 |
| 2021/0105051 A1* | 4/2021 | Min | H04B 7/06 |

OTHER PUBLICATIONS

Chen et al., "Multi-stage beamforming codebook for 60GHz WPAN", Proceedings of the 2011 6th International ICST Conference on Communications and Networking in China, Aug. 17-19, 2011, 1 page.

Li et al., "On the Efficient Beam-Forming Training for 60GHz Wireless Personal Area Networks", IEEE Transactions on Wireless Communications, vol. 12, No. 2, Jan. 4, 2013, 1 page.

Nitsche et al., "IEEE 802.11ad: directional 60 GHz communication for multi-Gigabit-per-second Wi-Fi", IEEE Communications Magazine, vol. 52, No. 12, Dec. 2014, 1 page.

Akhtar et al., "Efficient network level beamforming training for IEEE 802.11ad WLANs", Proceedings of the International Symposium on Performance Evaluation of Computer and Telecommunication Systems, Jul. 26-29, 2015, 1 page.

Li et al., "Performance Analysis of Millimeter-wave Cellular Networks with Two-stage Beamforming Initial Access Protocols", 2016 50th Asilomar Conference on Signals, Systems and Computers, Nov. 6-9, 2016, 1 page.

Guo et al., "A Comparison of Beam Refinement Algorithms for Millimeter Wave Initial Access", 2017 IEEE 28th Annual International Symposium on Personal, Indoor, and Mobile Radio Communications (PIMRC), Oct. 8-13, 2018, 1 page.

Song et al., "A Scalable and Statistically Robust Beam Alignment Technique for mm-Wave Systems", May 8, 2018, 13 pages.

International Preliminary Report on Patentability for International Application No. PCT/US2019/061107, dated Jun. 3, 2021, 9 pages.

International Search Report and Written Opinion for International Application No. PCT/US2019/061107, dated Mar. 20, 2020, 11 pages.

* cited by examiner

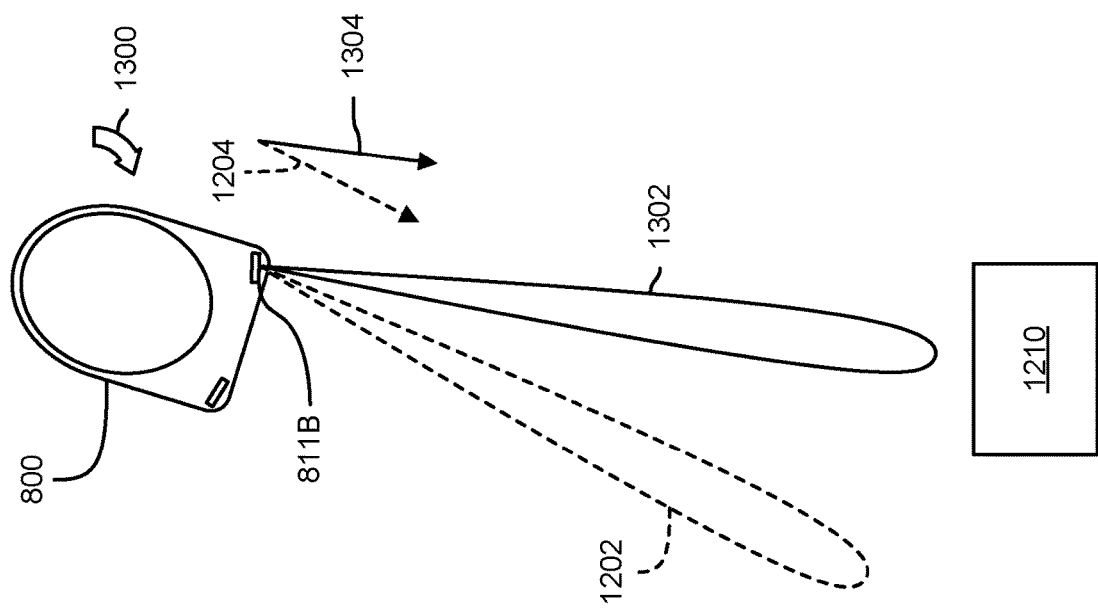

Method
1400

```
                    ┌─────────┐
                    │  Start  │
                    └────┬────┘
                         ▼
┌─────────────────────────────────────────────────────────────────────┐
│ Establish, in a first direction, a directional wireless link        │
│ between a first computing device and a second computing device by   │
│ focusing a gain of a first antenna array of the first computing     │
│ device in a first direction                                         │
│ 1410                                                                │
└─────────────────────────────────────────────────────────────────────┘
                         ▼
┌─────────────────────────────────────────────────────────────────────┐
│ Exchange, over the directional wireless link in the first           │
│ direction, first data between the first computing device and the    │
│ second computing device                                             │
│ 1420                                                                │
└─────────────────────────────────────────────────────────────────────┘
                         ▼
┌─────────────────────────────────────────────────────────────────────┐
│ Determine that a change to the position or the orientation of the   │
│ first computing device results in the signal path of the            │
│ directional wireless link being outside of the first antenna        │
│ array's field of view                                               │
│ 1430                                                                │
└─────────────────────────────────────────────────────────────────────┘
                         ▼
┌─────────────────────────────────────────────────────────────────────┐
│ Determine that the change to the position or the orientation of     │
│ the first computing device results in the signal path of the        │
│ directional wireless link being within the field of view of a       │
│ second antenna array of the first computing device in a second      │
│ direction                                                           │
│ 1440                                                                │
└─────────────────────────────────────────────────────────────────────┘
                         ▼
┌─────────────────────────────────────────────────────────────────────┐
│ Redirect the directional wireless link to the second direction by   │
│ focusing a gain of the second antenna array in the second direction │
│ 1450                                                                │
└─────────────────────────────────────────────────────────────────────┘
                         ▼
┌─────────────────────────────────────────────────────────────────────┐
│ Exchange, over the directional wireless link in the second          │
│ direction, second data between the first computing device and the   │
│ second computing device                                             │
│ 1460                                                                │
└─────────────────────────────────────────────────────────────────────┘
                         ▼
                    ┌─────────┐
                    │   End   │
                    └─────────┘
```

*FIG. 14*

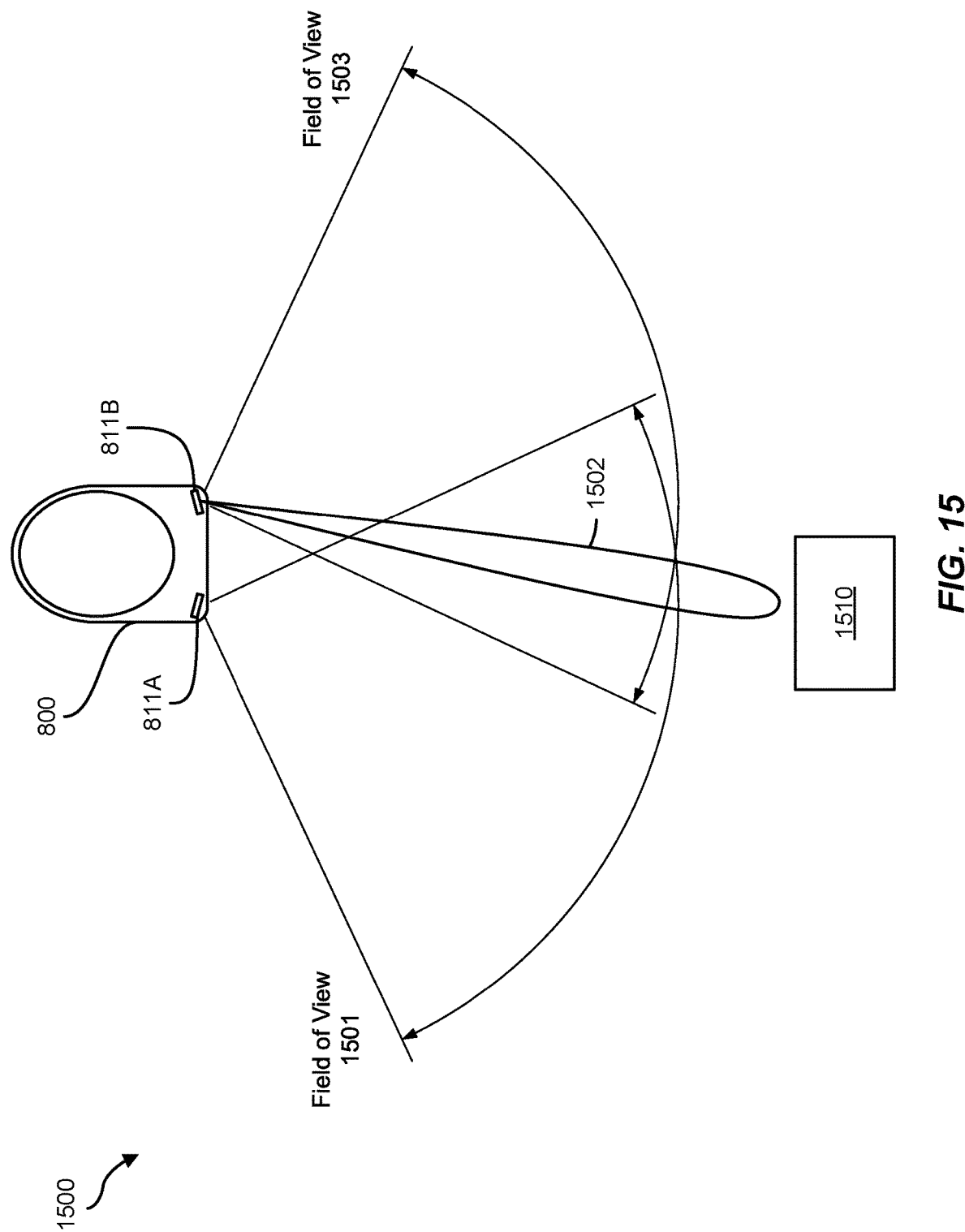

SYSTEMS AND METHODS FOR MAINTAINING DIRECTIONAL WIRELESS LINKS OF MOTILE DEVICES

BACKGROUND

This disclosure relates generally to motile computing devices, and more specifically to wearable and/or head-mounted display devices and systems.

Virtual reality (VR) and augmented reality (AR) headsets are gaining in popularity for use in a growing number of activities. Such headsets may integrate visual information into a user's field of view to enhance their surroundings or allow them to step into immersive three-dimensional environments. While virtual reality and augmented reality headsets are often utilized for gaming and other entertainment purposes, they are also commonly employed for purposes outside of recreation-for example, governments may use them for military training simulations, doctors may use them to practice surgery, and engineers may use them as visualization aids. Virtual and augmented reality systems are also increasingly recognized for their utility in facilitating interpersonal interactions between individuals in a variety of contexts.

Head-mounted devices, such as virtual and augmented reality headsets, typically need to be lightweight and have small profiles. Because of weight and size constraints, conventional head-mounted devices have generally contained limited processing and power resources. Conventional head-mounted devices often rely on wired connections to external devices that perform graphics processing, sensor-data (e.g., image-data) processing, and/or other computational tasks for the head-mounted devices. Reliance on external devices for performing processing tasks may continue since these devices are likely to include more and more sensors that will generate data that must be processed (perhaps using machine-learning algorithms that consume more processing power than the processing power of conventional head-mounted devices). Unfortunately, wired connections may unsatisfactorily confine or encumber users' movements, especially in virtual and augmented reality contexts where immersive experiences are often desired. For at least this reason, some conventional head-mounted devices (e.g., smart glasses) are now wireless devices. Unfortunately, weight, size, and form-factor constraints of many of these wireless head-mounted devices leave little to no room for processing units, batteries needed for powering powerful processing units, or heat-removal units for cooling of powerful processing units, which typically leads to these devices having limited computation power, limited power budgets, and/or a need to charge these devices frequently.

Some wearable computing devices have turned to low-power radio communication technologies (e.g., Bluetooth Low Energy (BLE) systems). However, these technologies may consume too much energy and/or have bandwidths or latencies that are too limiting for preferred designs of some wearable computing devices. Other highly directional radio communication technologies may exist (e.g., technologies that utilize the 60-gigahertz radio frequency band, such as WiGig) that may be capable of efficiently supporting high-bandwidth and low-latency communications. Unfortunately, conventional directional radio communication technologies typically are not efficient when applied to motile devices.

Some conventional directional communication technologies may set up a directional wireless link between two devices by performing an initial sector-sweep operation that roughly identifies sectors at which a signal path of the directional wireless link are present.

After the initial sector-sweep operation, a beam-refinement operation may be performed wherein transmission and/or reception gains of reconfigurable antenna arrays may be refined for highest throughput. In some examples, sector-sweep operations may be relatively slow and consume a relatively high amount of power when compared to beam-refinement operations. Unfortunately, when applied to motive devices, these conventional directional communication technologies may be unsuitable since poorly trained beams may have significantly less throughput when compared to well-trained beams. Moreover, sector-sweep operations may need to be performed more often in these situations leading to high power consumption and increased latencies. The instant disclosure, therefore, identifies and addresses a need for apparatus, systems, and methods for efficiently maintaining directional wireless links of motile devices, especially for wearable and virtual and augmented reality headsets and external processing devices.

SUMMARY

As will be described in greater detail below, the instant disclosure describes systems and methods for efficiently maintaining directional wireless links of motile computing devices. In one example, a computer-implemented method for efficiently maintaining directional links of motile computing devices may include (1) establishing a directional wireless link between a first computing device and a second computing device in a first direction (i.e., a direction of a signal path of the directional wireless link), (2) exchanging, over the directional wireless link in the first direction, first data between the first computing device and the second computing device, (3) determining, via a sensor of the first computing device, a change to a position or an orientation of the first computing device, (4) redirecting, based on the change, the directional wireless link to a second direction (i.e., the direction of the signal path of the directional wireless link after the change), and (5) exchanging, over the directional wireless link in the second direction, second data between the first computing device and the second computing device.

In some examples, the first computing device may be a motile head-mounted display device worn by a user, and the motile head-mounted display device may include a data source that generates the first data. In some examples, the second computing device may be an auxiliary processing device, and the second data may be a result of the auxiliary processing device processing the first data. In such examples, the step of exchanging the first data between the first computing device and the second computing device may include transmitting, over the directional wireless link in the first direction, the first data from the first computing device to the second computing device, and the step of exchanging the second data between the first computing device and the second computing device may include receiving, over the directional wireless link from the second direction, the second data at the first computing device from the second computing device. In some examples, the auxiliary processing device may be a motile wearable computing device worn by the user, and/or the sensor may include a gyroscope, an accelerometer, a magnetometer, or a video camera. In certain examples, the directional wireless link may utilize a 60-gigahertz radio frequency band.

In some examples, the first computing device may include at least one antenna array capable of spatial selectivity, the step of establishing the directional wireless link may include focusing a gain of the antenna array in the first direction, and the step of redirecting the directional wireless link may include focusing the gain of the antenna array in the second direction. In some examples, the first computing device may include a first antenna array capable of spatial selectivity and a second antenna array capable of spatial selectivity. In one example, the first antenna array's field of view may be different than the second array's field of view. In such examples, the step of establishing the directional wireless link may include focusing a gain of the first antenna array in the first direction, and the step of redirecting the directional wireless link may include (1) determining that the change to the position or the orientation of the first computing device results in the signal path of the directional wireless link being outside of the first antenna array's field of view, (2) determining that the change to the position or the orientation of the first computing device results in the signal path of the directional wireless link being within the second antenna array's field of view, and (3) focusing the gain of the second antenna array in the second direction. In some examples, the step of determining the change to the position or the orientation of the first computing device may include determining a change to at least one of a pitch of the first computing device, a yaw of the first computing device, or a roll of the first computing device.

In some examples, the second computing device may include at least one antenna array capable of spatial selectivity, the step of establishing the directional wireless link may include focusing a gain of the antenna array in the first direction, the step of determining the change to the position or the orientation of the first computing device may include receiving, from the first computing device at the second computing device over the directional wireless link from the first direction, an indication of the position or the orientation of the first computing device, and the step of redirecting the directional wireless link may include focusing the gain of the antenna array in the second direction. In some examples, the directional wireless link may be established as part of performing a sector-sweep operation.

A corresponding motile wearable computing device may include (1) a data source that generates first data, (2) a sensor subsystem configured to measure a position or an orientation of the motile wearable computing device, (3) a directional-communication subsystem configured to (a) establish, in a first direction, a directional wireless link between the motile wearable computing device and a second computing device, the first direction being a direction of a signal path of the directional wireless link, (b) exchange, over the directional wireless link in the first direction, the first data between the motile wearable computing device and the second computing device, (c) redirect the directional wireless link to a second direction based on a change to the position or the orientation of the motile wearable computing device, the second direction being the direction of the signal path of the directional wireless link, and (d) exchange, over the directional wireless link in the second direction, second data between the motile wearable computing device and the second computing device, and (4) an output device for displaying the second data to a wearer of the motile wearable computing device. In some examples, the directional wireless link may utilize a 60-gigahertz radio frequency band.

In some examples, the motile wearable computing device may be a motile head-mounted display device, and the output device may be a display. In some examples, the sensor subsystem may include a simultaneous localization and mapping subsystem that includes a plurality of video cameras and that is configured to use the plurality of video cameras to (1) map an environment of the motile wearable computing device and (2) localize the motile wearable computing device within the environment. In some examples, the sensor subsystem may include an inertial measurement unit that includes one or more of a gyroscope, an accelerometer, and a magnetometer.

In some examples, the sensor subsystem may be further configured to transmit an indication of the change to the position or the orientation of the motile wearable computing device to the directional-communication subsystem. In some examples, the motile wearable computing device may further include an antenna array capable of spatial selectivity, and the directional-communication subsystem may be configured to establish the directional wireless link by focusing a gain of the antenna array in the first direction and redirect the directional wireless link by focusing the gain of the antenna array in the second direction. In at least one example, the motile wearable computing device may further include a first antenna array capable of spatial selectivity and a second antenna array capable of spatial selectivity. In such examples, the first antenna array's field of view may be different than the second array's field of view, and the directional-communication subsystem may be configured to (1) establish the directional wireless link by focusing a gain of the first antenna array in the first direction and (2) redirect the directional wireless link by (a) determining that the change to the position or the orientation of the first computing device results in the signal path of the directional wireless link being outside of the first antenna array's field of view, (b) determining that the change to the position or the orientation of the first computing device results in the signal path of the directional wireless link being within the second antenna array's field of view, and (c) focusing the gain of the second antenna array in the second direction.

A corresponding system may include a motile head-mounted display device and an auxiliary processing device. In some examples, the motile head-mounted display device may include (1) a data source that generates first data, (2) a sensor subsystem configured to measure a position or an orientation of the motile head-mounted display device, (3) a directional-communication subsystem configured to (a) establish, in a first direction, a directional wireless link between the motile head-mounted display device and an auxiliary processing device, the first direction being a current direction of a signal path of the directional wireless link, (b) transmit, over the directional wireless link in the first direction, the first data from the motile head-mounted display device to the auxiliary processing device, (c) redirect the directional wireless link to a second direction based on a change to the position or the orientation of the motile head-mounted display device, the second direction being the direction of the signal path of the directional wireless link, and (d) receive, over the directional wireless link from the second direction, second data at the motile head-mounted display device from the auxiliary processing device, and (4) an output device for displaying the second data to a wearer of the motile head-mounted display device. Additionally, the auxiliary processing device may be configured to (1) receive the first data from the motile head-mounted display device, (2) generate the second data by processing the first data, and (3) transmit the second data to the motile head-mounted display device. In at least one example, the auxiliary processing device may be a motile wearable computing device worn by the wearer.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 13 is a top-down view of the exemplary directional wireless link illustrated in FIG. 12 after being refined based on an exemplary change in orientation of one of the two computing devices illustrated in FIG. 12 in accordance with some embodiments.

FIG. 14 is a flow diagram of an exemplary method for maintaining directional wireless links of an exemplary motile computing device having two antenna arrays in accordance with some embodiments.

FIG. 15 is a top-down view of an exemplary directional wireless link between two computing devices in accordance with some embodiments.

Figure 1:
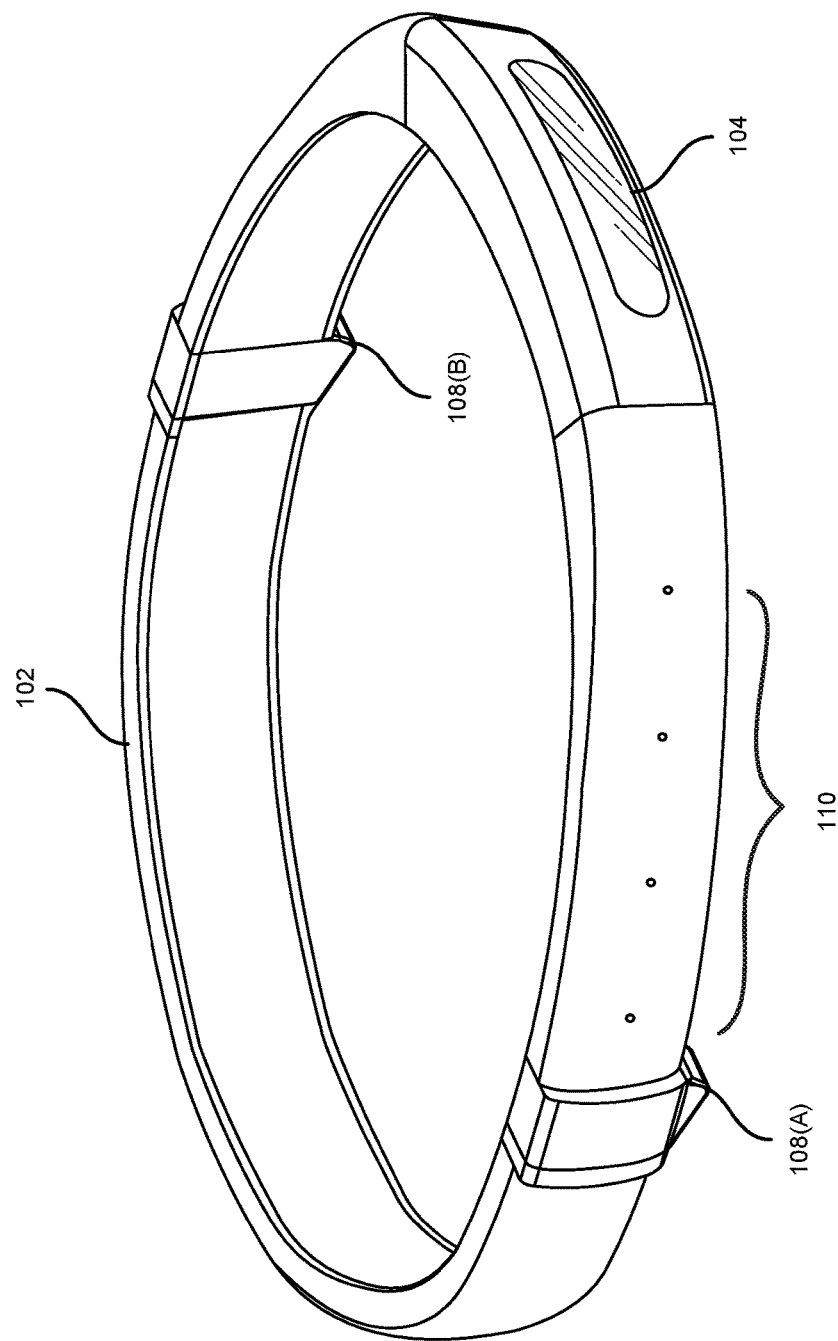
FIG. 1 illustrates an embodiment of an artificial reality headset.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for efficiently maintaining directional wireless links (e.g., 60-gigahertz wireless links) of certain motile computing devices (e.g., wearable computing devices whose positions and/or orientations are typically tracked for purposes other than wireless-link beamforming). As will be explained in greater detail below, embodiments of the instant disclosure may use sensor measurements of a motile computing device's position and/or orientation to steer a directional wireless beam established between the motile computing device and another motile or stationary computing device (e.g., a motile or stationary auxiliary computing device that performs computational tasks for the motile computing device). In some examples, embodiments of the instant disclosure may perform a full sector sweep to establish an initial directional wireless beam. Using position and/or orientation sensor measurements, embodiments of the instant disclosure may measure changes in the motile computing device's position and/or orientation (e.g., pitch, yaw, and roll) that may be used to adjust or refine the direction of the already established wireless beam. By reusing position and/or orientation measurements of a motile computing device's position and/or orientation to refine and adjust high-throughput directional wireless links of the motile computing device, embodiments of the instant disclosure may efficiently maintain the directional wireless links despite the movements of the motile computing device and the highly directional nature of the directional wireless links. Accordingly, the disclosed systems may improve existing directional wireless communication technologies when applied to motile computing devices such as VR and AR headsets. Embodiments of the instant disclosure may also provide various other advantages and features, as discussed in greater detail below.

Embodiments of the instant disclosure may include or be implemented in conjunction with various types of artificial reality systems. Artificial reality is a form of reality that has been adjusted in some manner before presentation to a user, which may include, e.g., a virtual reality (VR), an augmented reality (AR), a mixed reality (MR), a hybrid reality, or some combination and/or derivative thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to a viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

Artificial reality systems may be implemented in a variety of different form factors and configurations. Some artificial reality systems may be designed to work without near-eye displays (NEDs), an example of which is AR system 100 in FIG. 1. Other artificial reality systems may include an NED that also provides visibility into the real world (e.g., AR system 200 in FIG. 2) or that visually immerses a user in an artificial reality (e.g., VR system 300 in FIG. 3). While some artificial reality devices may be self-contained systems, other artificial reality devices may communicate and/or coordinate with external devices to provide an artificial reality experience to a user. Examples of such external devices include handheld controllers, mobile devices, desktop computers, devices worn by a user, devices worn by one or more other users, and/or any other suitable external system.

Turning to FIG. 1, AR system 100 generally represents a wearable device dimensioned to fit about a body part (e.g., a head) of a user. As shown in FIG. 1, system 100 may include a frame 102 and a camera assembly 104 that is coupled to frame 102 and configured to gather information about a local environment by observing the local environment. AR system 100 may also include one or more audio devices, such as output audio transducers 108(A) and 108(B) and input audio transducers 110. Output audio transducers 108(A) and 108(B) may provide audio feedback and/or content to a user, and input audio transducers 110 may capture audio in a user's environment.

As shown, AR system 100 may not necessarily include an NED positioned in front of a user's eyes. AR systems without NEDs may take a variety of forms, such as head bands, hats, hair bands, belts, watches, wrist bands, ankle bands, rings, neckbands, necklaces, chest bands, eyewear frames, and/or any other suitable type or form of apparatus. While AR system 100 may not include an NED, AR system 100 may include other types of screens or visual feedback devices (e.g., a display screen integrated into a side of frame 102).

Figure 2:
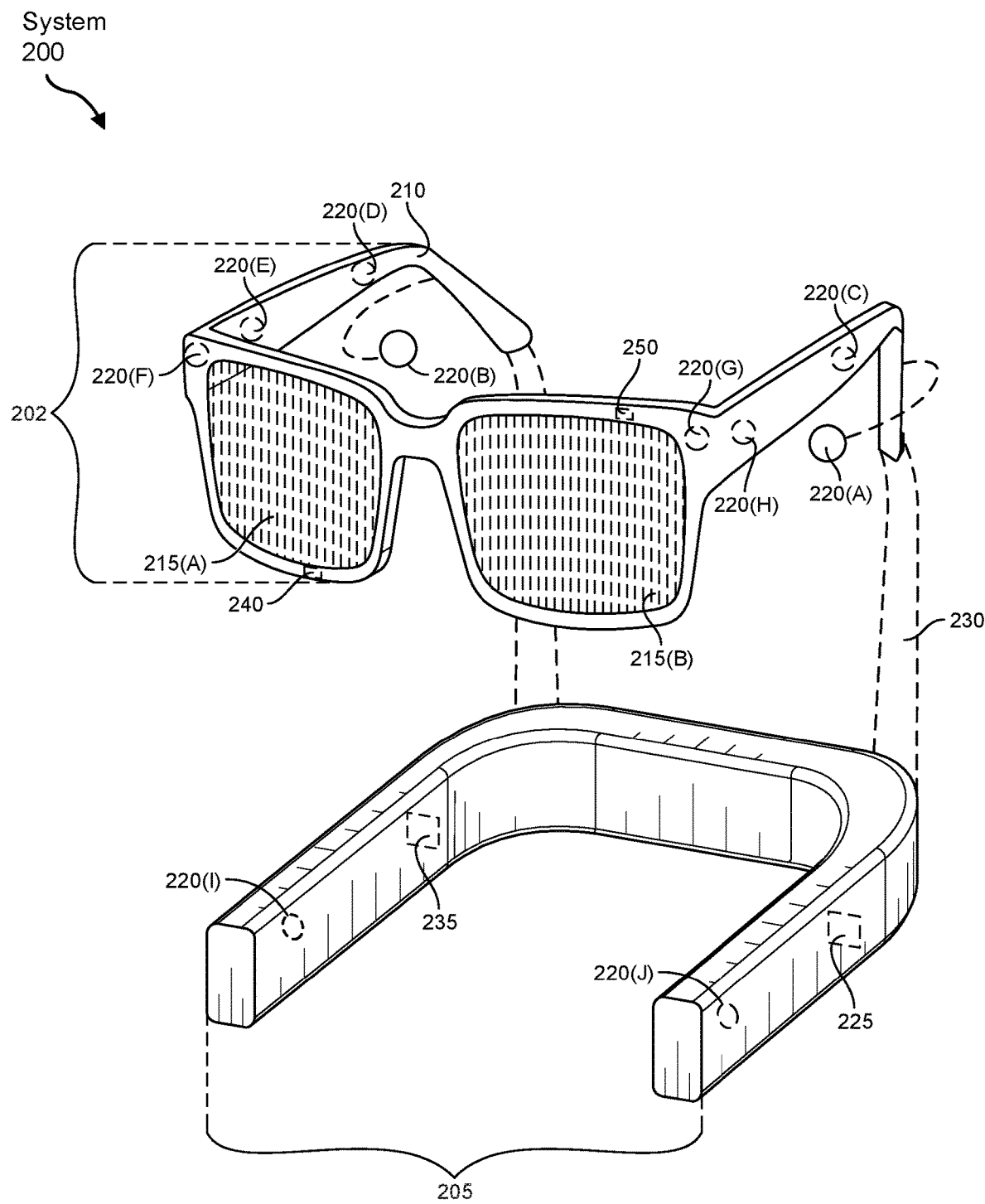
FIG. 2 illustrates an embodiment of an augmented reality headset and a corresponding neckband.

The embodiments discussed in this disclosure may also be implemented in AR systems that include one or more NEDs. For example, as shown in FIG. 2, AR system 200 may include an eyewear device 202 with a frame 210 configured to hold a left display device 215(A) and a right display device 215(B) in front of a user's eyes. Display devices 215(A) and 215(B) may act together or independently to present an image or series of images to a user. While AR system 200 includes two displays, embodiments of this disclosure may be implemented in AR systems with a single NED or more than two NEDs.

In some embodiments, AR system 200 may include one or more sensors, such as sensor 240. Sensor 240 may generate measurement signals in response to motion of AR system 200 and may be located on substantially any portion of frame 210. Sensor 240 may include a position sensor, an inertial measurement unit (IMU), a depth camera assembly, or any combination thereof. In some embodiments, AR system 200 may or may not include sensor 240 or may include more than one sensor. In embodiments in which sensor 240 includes an IMU, the IMU may generate calibration data based on measurement signals from sensor 240. Examples of sensor 240 may include, without limitation, accelerometers, gyroscopes, magnetometers, other suitable types of sensors that detect motion, sensors used for error correction of the IMU, or some combination thereof.

AR system 200 may also include a microphone array with a plurality of acoustic sensors 220(A)-220(J), referred to collectively as acoustic sensors 220. Acoustic sensors 220 may be transducers that detect air pressure variations induced by sound waves. Each acoustic sensor 220 may be configured to detect sound and convert the detected sound into an electronic format (e.g., an analog or digital format). The microphone array in FIG. 2 may include, for example, ten acoustic sensors: 220(A) and 220(B), which may be designed to be placed inside a corresponding ear of the user, acoustic sensors 220(C), 220(D), 220(E), 220(F), 220(G), and 220(H), which may be positioned at various locations on frame 210, and/or acoustic sensors 220(I) and 220(J), which may be positioned on a corresponding neckband 205.

The configuration of acoustic sensors 220 of the microphone array may vary. While AR system 200 is shown in FIG. 2 as having ten acoustic sensors 220, the number of acoustic sensors 220 may be greater or less than ten. In some embodiments, using higher numbers of acoustic sensors 220 may increase the amount of audio information collected and/or the sensitivity and accuracy of the audio information. In contrast, using a lower number of acoustic sensors 220 may decrease the computing power required by a controller 250 to process the collected audio information. In addition, the position of each acoustic sensor 220 of the microphone array may vary. For example, the position of an acoustic sensor 220 may include a defined position on the user, a defined coordinate on the frame 210, an orientation associated with each acoustic sensor, or some combination thereof.

Acoustic sensors 220(A) and 220(B) may be positioned on different parts of the user's ear, such as behind the pinna or within the auricle or fossa. Or, there may be additional acoustic sensors on or surrounding the ear in addition to acoustic sensors 220 inside the ear canal. Having an acoustic sensor positioned next to an ear canal of a user may enable the microphone array to collect information on how sounds arrive at the ear canal. By positioning at least two of acoustic sensors 220 on either side of a user's head (e.g., as binaural microphones), AR device 200 may simulate binaural hearing and capture a 3D stereo sound field around about a user's head. In some embodiments, the acoustic sensors 220(A) and 220(B) may be connected to AR system 200 via a wired connection, and in other embodiments, the acoustic sensors 220(A) and 220(B) may be connected to AR system 200 via a wireless connection (e.g., a Bluetooth connection). In still other embodiments, acoustic sensors 220(A) and 220(B) may not be used at all in conjunction with AR system 200.

Acoustic sensors 220 on frame 210 may be positioned along the length of the temples, across the bridge, above or below display devices 215(A) and 215(B), or some combination thereof. Acoustic sensors 220 may be oriented such that the microphone array is able to detect sounds in a wide range of directions surrounding the user wearing AR system 200. In some embodiments, an optimization process may be performed during manufacturing of AR system 200 to determine relative positioning of each acoustic sensor 220 in the microphone array.

AR system 200 may further include or be connected to an external device. (e.g., a paired device), such as neckband 205. As shown, neckband 205 may be coupled to eyewear device 202 via one or more connectors 230. Connectors 230 may be wired or wireless connectors and may include electrical and/or non-electrical (e.g., structural) components. In some cases, eyewear device 202 and neckband 205 may operate independently without any wired or wireless connection between them. While FIG. 2 illustrates the components of eyewear device 202 and neckband 205 in example locations on eyewear device 202 and neckband 205, the components may be located elsewhere and/or distributed differently on eyewear device 202 and/or neckband 205. In some embodiments, the components of eyewear device 202 and neckband 205 may be located on one or more additional peripheral devices paired with eyewear device 202, neckband 205, or some combination thereof. Furthermore, neckband 205 generally represents any type or form of paired device. Thus, the following discussion of neckband 205 may also apply to various other paired devices, such as smart watches, smart phones, wrist bands, other wearable devices, hand-held controllers, tablet computers, laptop computers, etc.

Pairing external devices, such as neckband 205, with AR eyewear devices may enable the eyewear devices to achieve the form factor of a pair of glasses while still providing sufficient battery and computation power for expanded capabilities. Some or all of the battery power, computational resources, and/or additional features of AR system 200 may be provided by a paired device or shared between a paired device and an eyewear device, thus reducing the weight, heat profile, and form factor of the eyewear device overall while still retaining desired functionality. For example, neckband 205 may allow components that would otherwise be included on an eyewear device to be included in neckband 205 since users may tolerate a heavier weight load on their shoulders than they would tolerate on their heads. Neckband 205 may also have a larger surface area over which to diffuse and disperse heat to the ambient environment. Thus, neckband 205 may allow for greater battery and computation capacity than might otherwise have been possible on a stand-alone eyewear device. Since weight carried in neckband 205 may be less invasive to a user than weight carried in eyewear device 202, a user may tolerate wearing a lighter eyewear device and carrying or wearing the paired device for greater lengths of time than the user would tolerate wearing a heavy standalone eyewear device, thereby enabling an artificial reality environment to be incorporated more fully into a user's day-to-day activities.

Neckband 205 may be communicatively coupled with eyewear device 202 and/or to other devices. The other devices may provide certain functions (e.g., tracking, localizing, depth mapping, processing, storage, etc.) to AR system 200. In the embodiment of FIG. 2, neckband 205 may include two acoustic sensors (e.g., 220(I) and 220(J)) that are part of the microphone array (or potentially form their own microphone subarray). Neckband 205 may also include a controller 225 and a power source 235.

Acoustic sensors 220(I) and 220(J) of neckband 205 may be configured to detect sound and convert the detected sound into an electronic format (analog or digital). In the embodiment of FIG. 2, acoustic sensors 220(I) and 220(J) may be positioned on neckband 205, thereby increasing the distance between neckband acoustic sensors 220(I) and 220(J) and other acoustic sensors 220 positioned on eyewear device 202. In some cases, increasing the distance between acoustic sensors 220 of the microphone array may improve the accuracy of beamforming performed via the microphone array. For example, if a sound is detected by acoustic sensors 220(C) and 220(D) and the distance between acoustic sensors 220(C) and 220(D) is greater than, e.g., the distance between acoustic sensors 220(D) and 220(E), the determined source location of the detected sound may be more accurate than if the sound had been detected by acoustic sensors 220(D) and 220(E).

Controller 225 of neckband 205 may process information generated by the sensors on neckband 205 and/or AR system 200. For example, controller 225 may process information from the microphone array that describes sounds detected by the microphone array. For each detected sound, controller 225 may perform a direction of arrival (DOA) estimation to estimate a direction from which the detected sound arrived at the microphone array. As the microphone array detects sounds, controller 225 may populate an audio data set with the information. In embodiments in which AR system 200 includes an IMU, controller 225 may compute all inertial and spatial calculations from the IMU located on eyewear device 202. Connector 230 may convey information between AR system 200 and neckband 205 and between AR system 200 and controller 225. The information may be in the form of optical data, electrical data, wireless data, or any other transmittable data form. Moving the processing of information generated by AR system 200 to neckband 205 may reduce weight and heat in eyewear device 202, making it more comfortable to a user.

Power source 235 in neckband 205 may provide power to eyewear device 202 and/or to neckband 205. Power source 235 may include, without limitation, lithium-ion batteries, lithium-polymer batteries, primary lithium batteries, alkaline batteries, or any other form of power storage. In some cases, power source 235 may be a wired power source. Including power source 235 on neckband 205 instead of on eyewear device 202 may help better distribute the weight and heat generated by power source 235.

As noted, some artificial reality systems may, instead of blending an artificial reality with actual reality, substantially replace one or more of a user's sensory perceptions of the real world with a virtual experience. One example of this type of system is a head-worn display system, such as VR system 300 in FIG. 3, that mostly or completely covers a user's field of view. VR system 300 may include a front rigid body 302 and a band 304 shaped to fit around a user's head. VR system 300 may also include output audio transducers 306(A) and 306(B). Furthermore, while not shown in FIG. 3, front rigid body 302 may include one or more electronic elements, including one or more electronic displays, one or more IMUs, one or more tracking emitters or detectors, and/or any other suitable device or system for creating an artificial reality experience.

Artificial reality systems may include a variety of types of visual feedback mechanisms. For example, display devices in AR system 200 and/or VR system 300 may include one or more liquid-crystal displays (LCDs), light emitting diode (LED) displays, organic LED (OLED) displays, and/or any other suitable type of display screen. Artificial reality systems may include a single display screen for both eyes or may provide a display screen for each eye, which may allow for additional flexibility for varifocal adjustments or for correcting a user's refractive error. Some artificial reality systems may also include optical subsystems having one or more lenses (e.g., conventional concave or convex lenses, Fresnel lenses, adjustable liquid lenses, etc.) through which a user may view a display screen.

In addition to or instead of using display screens, some artificial reality systems may include one or more projection systems. For example, display devices in AR system 200 and/or VR system 300 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial reality content and the real world. Artificial reality systems may also be configured with any other suitable type or form of image projection system.

Artificial reality systems may also include various types of computer vision components and subsystems. For example, AR system 100, AR system 200, and/or VR system 300 may include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial reality system may process data from one or more of these sensors to identify a location of a user, to map the real world, to provide a user with context about real-world surroundings, and/or to perform a variety of other functions.

Artificial reality systems may also include one or more input and/or output audio transducers. In the examples shown in FIGS. 1 and 3, output audio transducers 108(A), 108(B), 306(A), and 306(B) may include voice coil speakers, ribbon speakers, electrostatic speakers, piezoelectric speakers, bone conduction transducers, cartilage conduction transducers, and/or any other suitable type or form of audio transducer. Similarly, input audio transducers 110 may include condenser microphones, dynamic microphones, ribbon microphones, and/or any other type or form of input transducer. In some embodiments, a single transducer may be used for both audio input and audio output.

Figure 3:
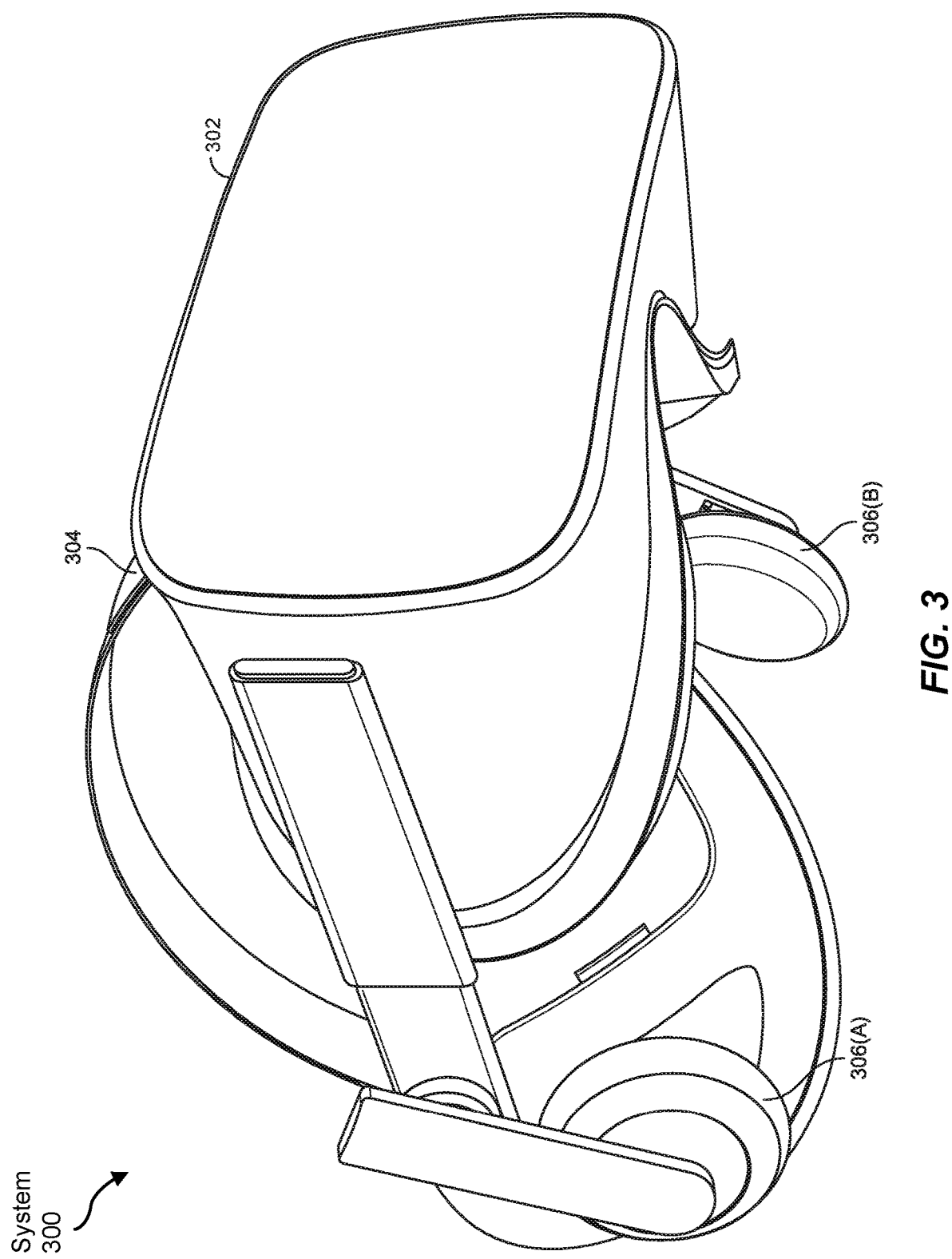
FIG. 3 illustrates an embodiment of a virtual reality headset.

While not shown in FIGS. 1-3, artificial reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial reality devices, within other artificial reality devices, and/or in conjunction with other artificial reality devices.

By providing haptic sensations, audible content, and/or visual content, artificial reality systems may create an entire virtual experience or enhance a user's real-world experience in a variety of contexts and environments. For instance, artificial reality systems may assist or extend a user's perception, memory, or cognition within a particular environment. Some systems may enhance a user's interactions with other people in the real world or may enable more immersive interactions with other people in a virtual world. Artificial reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, vision aids, etc.). The embodiments disclosed herein may enable or enhance a user's artificial reality experience in one or more of these contexts and environments and/or in other contexts and environments.

Some AR systems may map a user's environment using techniques referred to as "simultaneous location and mapping" (SLAM). SLAM mapping and location identifying techniques may involve a variety of hardware and software tools that can create or update a map of an environment while simultaneously keeping track of a device's or a user's location and/or orientation within the mapped environment. SLAM may use many different types of sensors to create a map and determine a device's or a user's position within the map.

SLAM techniques may, for example, implement optical sensors to determine a device's or a user's location, position, or orientation. Radios including WiFi, Bluetooth, global positioning system (GPS), cellular or other communication devices may also be used to determine a user's location relative to a radio transceiver or group of transceivers (e.g., a WiFi router or group of GPS satellites). Acoustic sensors such as microphone arrays or 2D or 3D sonar sensors may also be used to determine a user's location within an environment. AR and VR devices (such as systems 100, 200, and 300 of FIGS. 1-3, respectively) may incorporate any or all of these types of sensors to perform SLAM operations such as creating and continually updating maps of a device's or a user's current environment. In at least some of the embodiments described herein, SLAM data generated by these sensors may be referred to as "environmental data" and may indicate a device's or a user's current environment. This data may be stored in a local or remote data store (e.g., a cloud data store) and may be provided to a user's AR/VR device on demand.

When the user is wearing an AR headset or VR headset in a given environment, the user may be interacting with other users or other electronic devices that serve as audio sources. In some cases, it may be desirable to determine where the audio sources are located relative to the user and then present the audio sources to the user as if they were coming from the location of the audio source. The process of determining where the audio sources are located relative to the user may be referred to herein as "localization," and the process of rendering playback of the audio source signal to appear as if it is coming from a specific direction may be referred to herein as "spatialization."

Localizing an audio source may be performed in a variety of different ways. In some cases, an AR or VR headset may initiate a DOA analysis to determine the location of a sound source. The DOA analysis may include analyzing the intensity, spectra, and/or arrival time of each sound at the AR/VR device to determine the direction from which the sound originated. In some cases, the DOA analysis may include any suitable algorithm for analyzing the surrounding acoustic environment in which the artificial reality device is located.

For example, the DOA analysis may be designed to receive input signals from a microphone and apply digital signal processing algorithms to the input signals to estimate the direction of arrival. These algorithms may include, for example, delay and sum algorithms where the input signal is sampled, and the resulting weighted and delayed versions of the sampled signal are averaged together to determine a direction of arrival. A least mean squared (LMS) algorithm may also be implemented to create an adaptive filter. This adaptive filter may then be used to identify differences in signal intensity, for example, or differences in time of arrival. These differences may then be used to estimate the direction of arrival. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct-path audio signal. Those bins having a portion of the direct-path signal may then be analyzed to identify the angle at which a microphone array received the direct-path audio signal. The determined angle may then be used to identify the direction of arrival for the received input signal. Other algorithms not listed above may also be used alone or in combination with the above algorithms to determine DOA.

In some embodiments, different users may perceive the source of a sound as coming from slightly different locations. This may be the result of each user having a unique head-related transfer function (HRTF), which may be dictated by a user's anatomy including ear canal length and the positioning of the ear drum. The artificial reality device may provide an alignment and orientation guide, which the user may follow to customize the sound signal presented to the user based on their unique HRTF. In some embodiments, an AR or VR device may implement one or more microphones to listen to sounds within the user's environment. The AR or VR device may use a variety of different array transfer functions (ATFs) (e.g., any of the DOA algorithms identified above) to estimate the direction of arrival for the sounds. Once the direction of arrival has been determined, the artificial reality device may play back sounds to the user according to the user's unique HRTF. Accordingly, the DOA estimation generated using an ATF may be used to determine the direction from which the sounds are to be played from. The playback sounds may be further refined based on how that specific user hears sounds according to the HRTF.

In addition to or as an alternative to performing a DOA estimation, an artificial reality device may perform localization based on information received from other types of sensors. These sensors may include cameras, infrared radiation (IR) sensors, heat sensors, motion sensors, global positioning system (GPS) receivers, or in some cases, sensor that detect a user's eye movements. For example, an artificial reality device may include an eye tracker or gaze detector that determines where a user is looking. Often, a user's eyes will look at the source of a sound, if only briefly. Such clues provided by the user's eyes may further aid in determining the location of a sound source. Other sensors such as cameras, heat sensors, and IR sensors may also indicate the location of a user, the location of an electronic device, or the location of another sound source. Any or all of the above methods may be used individually or in combination to determine the location of a sound source and may further be used to update the location of a sound source over time.

Some embodiments may implement the determined DOA to generate a more customized output audio signal for the user. For instance, an acoustic transfer function may characterize or define how a sound is received from a given location. More specifically, an acoustic transfer function may define the relationship between parameters of a sound at its source location and the parameters by which the sound signal is detected (e.g., detected by a microphone array or detected by a user's ear). An artificial reality device may include one or more acoustic sensors that detect sounds within range of the device. A controller of the artificial reality device may estimate a DOA for the detected sounds (using, e.g., any of the methods identified above) and, based on the parameters of the detected sounds, may generate an acoustic transfer function that is specific to the location of the device. This customized acoustic transfer function may thus be used to generate a spatialized output audio signal where the sound is perceived as coming from a specific location.

Indeed, once the location of the sound source or sources is known, the artificial reality device may re-render (i.e., spatialize) the sound signals to sound as if coming from the direction of that sound source. The artificial reality device may apply filters or other digital signal processing that alter the intensity, spectra, or arrival time of the sound signal. The digital signal processing may be applied in such a way that the sound signal is perceived as originating from the determined location. The artificial reality device may amplify or subdue certain frequencies or change the time that the signal arrives at each ear. In some cases, the artificial reality device may create an acoustic transfer function that is specific to the location of the device and the detected direction of arrival of the sound signal. In some embodiments, the artificial reality device may re-render the source signal in a stereo device or multi-speaker device (e.g., a surround sound device). In such cases, separate and distinct audio signals may be sent to each speaker. Each of these audio signals may be altered according to a user's HRTF and according to measurements of the user's location and the location of the sound source to sound as if they are coming from the determined location of the sound source. Accordingly, in this manner, the artificial reality device (or speakers associated with the device) may re-render an audio signal to sound as if originating from a specific location.

Figure 4:
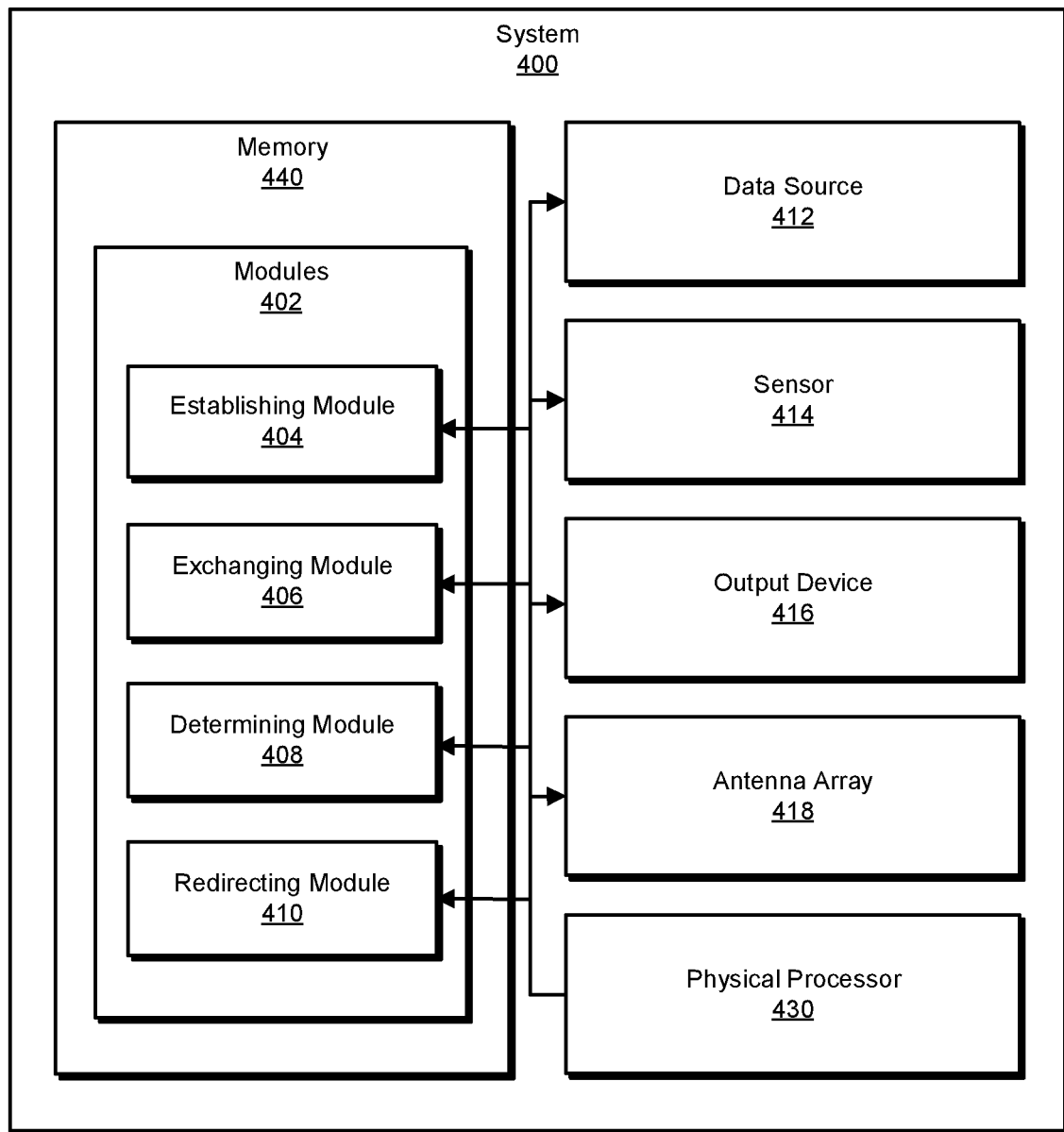
FIG. 4 is a block diagram of an exemplary system for maintaining directional wireless links of motile computing devices in accordance with some embodiments.

FIG. 4 is a block diagram of an exemplary system 400 for efficiently maintaining directional wireless links of motile computing devices. As illustrated in this figure, example system 400 may include one or more modules 402 for performing one or more tasks. As will be explained in greater detail below, modules 402 may include an establishing module 404 configured to establish a directional wireless link between a first computing device and a second computing device in an initial direction. Modules 402 may also include an exchanging module 406 configured to exchange, over the directional wireless link, data between the first computing device and the second computing device, a determining module 408 configured to determine, via a sensor 414 of the first computing device, a change to a position or an orientation of the first computing device, and a redirecting module 410 configured to redirect or refine the direction of the directional wireless link based on the change. Although illustrated as separate elements, one or more of modules 402 in FIG. 4 may represent portions of a single module or application.

In certain embodiments, one or more of modules 402 in FIG. 4 may represent one or more software applications or programs that, when executed by a computing device, may cause the computing device to perform one or more tasks. For example, and as will be described in greater detail below, one or more of modules 402 may represent modules stored and configured to run on one or more computing devices, such as the devices illustrated in FIG. 5 (e.g., computing device 502 and/or computing device 506). One or more of modules 402 in FIG. 4 may also represent all or portions of one or more special-purpose computers configured to perform one or more tasks.

As illustrated in FIG. 4, example system 400 may also include one or more memory devices, such as memory 440. Memory 440 generally represents any type or form of volatile or non-volatile storage device or medium capable of storing data and/or computer-readable instructions. In one example, memory 440 may store, load, and/or maintain one or more of modules 402. Examples of memory 440 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 4, example system 400 may also include one or more physical processors, such as physical processor 430. Physical processor 430 generally represents any type or form of hardware-implemented processing unit capable of interpreting and/or executing computer-readable instructions. In one example, physical processor 430 may access and/or modify one or more of modules 402 stored in memory 440. Examples of physical processor 430 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 4, example system 400 may also include one or more additional elements, such as a data source 412 that produces data. In some embodiments, the term "data source" may refer to any electronic component that generates data. Examples of electronic components that produce data may include, without limitation, sensors (e.g., gyroscopic sensors, accelerometers, altimeters, global positioning system devices, light sensors, audio sensors, power sensors, high or low resolution cameras, etc.), input components (e.g., touch screens, buttons, joysticks, click wheels, scrolling wheels, touch pads, key pads, keyboards, data ports, etc.), processor components, data-storage components, and diagnostic components. As shown in FIG. 4, system 400 may also include a sensor 414 configured to measure a position or an orientation of a computing device, output device 416 (e.g., a display or an audio transducer), and an antenna array 418 capable of spatial selectivity (e.g., beamforming). In some examples, sensor 414 may represent one or more sensors capable of simultaneously mapping a device's environment and localizing the device's position and orientation within the environment. In some examples, sensor 414 may represent one or more sensors whose primary purpose is to simultaneously map a user's environment and localize the user's position and orientation within the environment in order to spatially present data (e.g. visual or audio data) to the user. Additionally or alternatively, sensor 414 may represent some or all of the sensors (sensor 240 in FIG. 2), the SLAM sensors and components, and/or the computer-vision components and subsystems described above. In some examples, antenna array 418 may include any type or form of reconfigurable or adaptive antenna array. In at least one example, antenna array 218 may be an antenna array configured to directionally receive and/or transmit radio signals in the 60-gigahertz radio frequency band.

Figure 5:
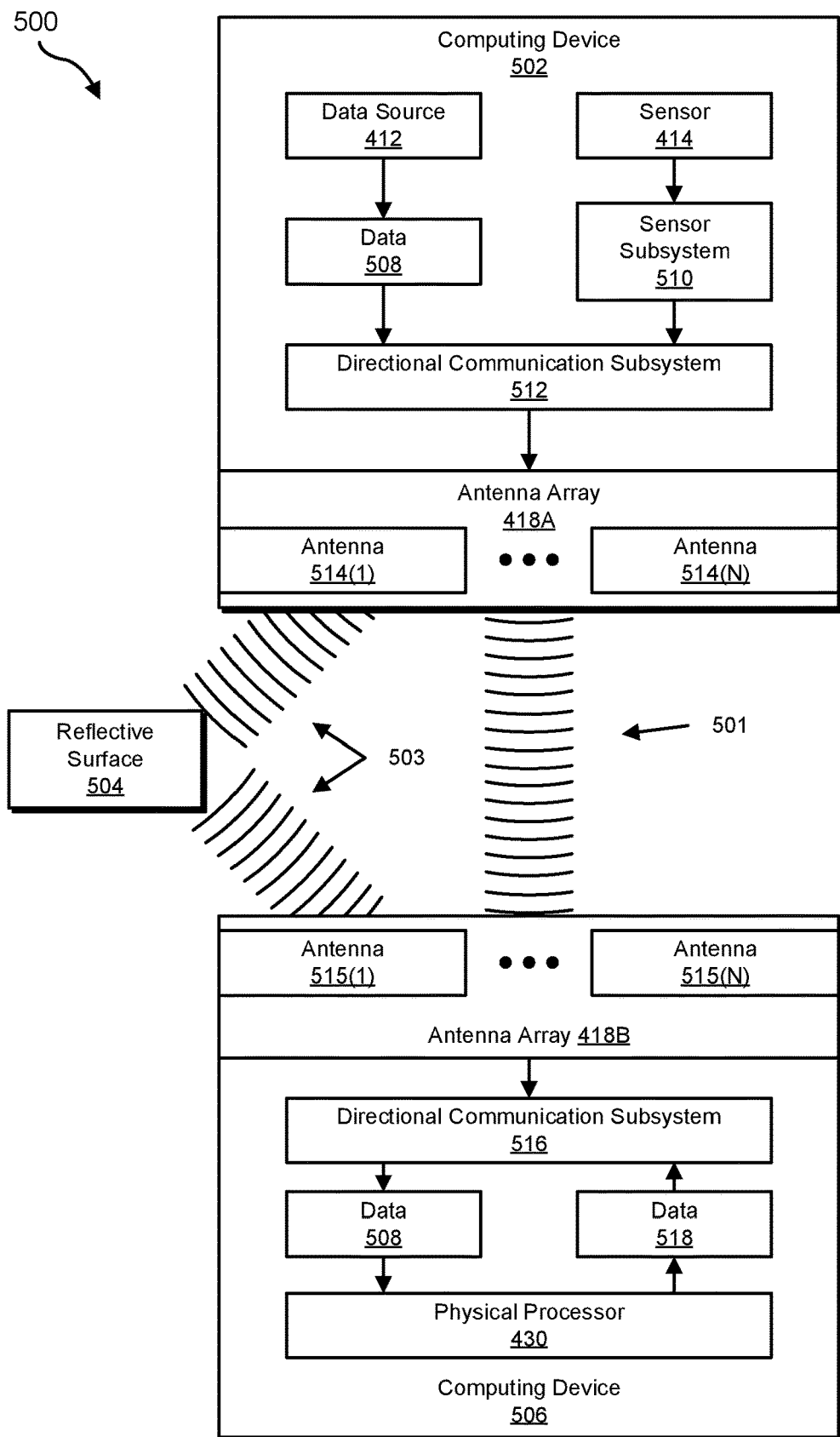
FIG. 5 is a block diagram of an additional exemplary system for maintaining directional wireless links of motile computing devices in accordance with some embodiments.

Example system 400 in FIG. 4 may be implemented in a variety of ways. For example, all or a portion of example system 400 may represent portions of an example system 500 in FIG. 5. As shown in FIG. 5, system 500 may include a computing device 502 communicatively coupled to a computing device 506 via a direct directional wireless signal 501 or an indirect directional wireless signal 503. In some examples, computing device 502 may include data source 412 that produces data 508 and sensor 414 used by a sensor subsystem 510 to determine changes to the position and/or orientation of computing device 502. As shown in FIG. 5, computing device 502 may include a directional communication subsystem 512 for transmitting data 508 to computing device 506 and/or receiving data 518 from computing device 506 via antenna array 418A, and computing device 506 may include a directional communication subsystem 516 for receiving data 508 from computing device 502 and/or transmitting data 518 to computing device 502 via antenna array 418B. In the example shown in FIG. 5, directional wireless signal 501 may represent a direct or line-of-sight directional wireless signal between computing device 502 and computing device 506, and directional wireless signal 503 may represent an indirect or reflected directional wireless signal that is reflected between computing device 502 and computing device 506 by a reflective surface 504.

Computing device 502 and computing device 506 generally represent any type or form of computing device capable of reading and/or executing computer-executable instructions. Examples of computing device 502 and computing device 506 include, without limitation, servers, desktops, laptops, tablets, cellular phones, (e.g., smartphones), personal digital assistants (PDAs), multimedia players, embedded systems, wearable computing devices (e.g., smart watches, smart glasses, head-mounted displays, etc.), gaming consoles, AR and VR devices (such as systems 100, 200, and 300 of FIGS. 1-3, respectively), wireless access points, combinations of one or more of the same, or any other suitable computing device. As shown in FIG. 5, antenna array 418A may include antennae 514(1)-(N) whose gains and/or phases may be adjusted in order to adjust the radiation pattern or receiving pattern of antenna array 418A. Similarly, antenna array 418B may include antennae 515(1)-(N) whose gains and/or phases may be adjusted in order to adjust the radiation pattern or receiving pattern of antenna array 418B.

In some examples, computing device 502 may be a motile computing device, and computing device 506 may be a stationary computing device. In these examples, computing device 502 may use sensor measurements acquired by sensor 414 or sensor subsystem 510 of its own position and/or orientation to steer directional wireless signal 501 or indirect directional wireless signal 503. Similarly, computing device 506 may use the sensor measurements of the position and/or orientation of computing device 502, which were acquired by sensor 414 or sensor subsystem 510 and relayed to computing device 506 by computing device 502, to steer directional wireless signal 501 or indirect directional wireless signal 503.

In other examples, computing devices 502 and 506 may both be motile computing devices. In such examples, computing device 506 may also have a sensor and sensor subsystem similar to that of computing device 502. In these examples, computing device 502 may use sensor measurements acquired by sensor 414 or sensor subsystem 510 of its own position and/or orientation and/or sensor measurements acquired by the sensor or sensor subsystem of computing device 506 of the position and/or orientation of computing device 506 to steer directional wireless signal 501 or indirect directional wireless signal 503. Similarly, computing device 506 may use sensor measurements, acquired by its own sensor or sensor subsystem, of its own position and/or orientation and/or the sensor measurements of the position and/or orientation of computing device 502, which were acquired by sensor 414 or sensor subsystem 510 and relayed to computing device 506 by computing device 502, to steer directional wireless signal 501 or indirect directional wireless signal 503.

Many other devices or subsystems may be connected to system 400 in FIG. 4 and/or system 500 in FIG. 5. Conversely, all of the components and devices illustrated in FIGS. 4 and 5 need not be present to practice the embodiments described and/or illustrated herein. The devices and subsystems referenced above may also be interconnected in different ways from those shown in FIG. 5. Systems 400 and 500 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

As will be described in greater detail below, one or more of modules 402 from FIG. 4 may, when executed by computing device 502, enable computing device 502 to (1) establish a directional wireless link with computing device 506 by focusing a gain of antenna array 418A in an initial direction (e.g., the relative direction of directional wireless signal 501 or directional wireless signal 503), (2) exchange, over the directional wireless link in the first direction, data 508 with computing device 506, (3) determine, via sensor 414 of computing device 502, a change to a position or an orientation of computing device 502, (4) redirect, based on the change, the directional wireless link by refocusing the gain of antenna array 418A to a second direction (e.g., the relative direction of directional wireless signal 501 or directional wireless signal 503 resulting from the change), and (5) exchange, over the directional wireless link in the second direction, data 518 with computing device 506. In some examples, one or more of modules 402 from FIG. 4 may, when executed by computing device 502, enable computing device 502 to quickly transition the directional wireless link between directional wireless signal 501 and directional wireless signal 503 based on changes to the position or the orientation of computing device 502 relative to computing device 506, its environment, and/or directional wireless signal 501 and directional wireless signal 503.

In some examples, one or more of modules 402 from FIG. 4 may, when executed by computing device 506, enable computing device 506 to (1) establish a directional wireless link with computing device 502 by focusing a gain of antenna array 418B in an initial direction (e.g., the initial relative direction of directional wireless signal 501 or directional wireless signal 503), (2) exchange, over the directional wireless link in the first direction, data 508 with computing device 502, (3) determine, via sensor 414 of computing device 502, a change to a position or an orientation of computing device 502, (4) redirect, based on the change, the directional wireless link by refocusing the gain of antenna array 418B to a second direction (e.g., the relative direction of the signal path of directional wireless signal 501 and directional wireless signal 503 after the change), and (5) exchange, over the directional wireless link in the second direction, data 518 with computing device 502. Additionally or alternatively, one or more of modules 402 from FIG. 4 may, when executed by computing device 506, enable computing device 506 to quickly transition the directional wireless link between directional wireless signal 501 and directional wireless signal 503 based on changes to the position or the orientation of computing device 502 relative to computing device 506, its environment, and/or directional wireless signal 501 and directional wireless signal 503.

Figure 6:
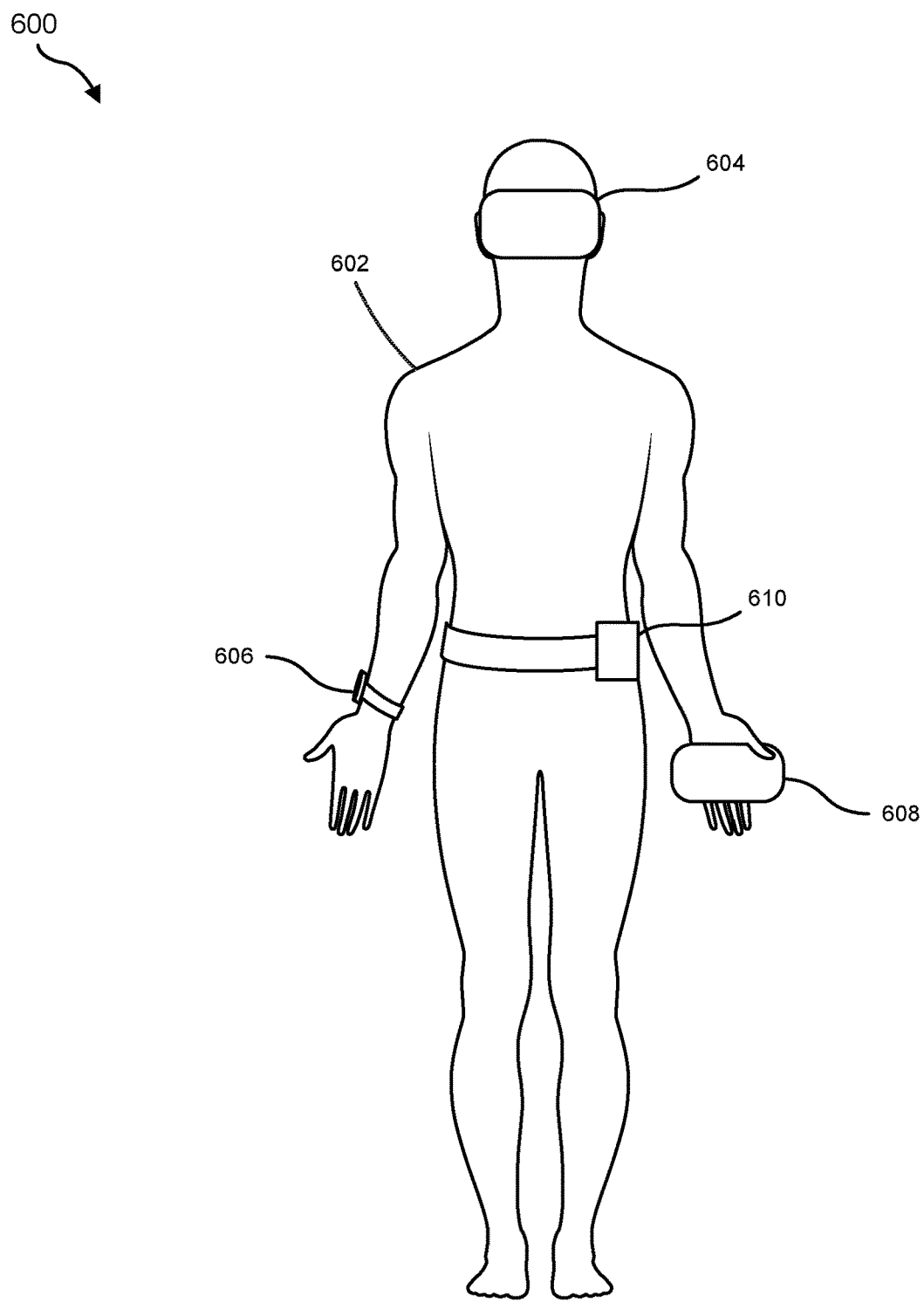
FIG. 6 is a front view of a user wearing components of an exemplary data-exchanging system in accordance with some embodiments.

Example systems 400 and 500 in FIGS. 4 and 5 may be implemented in a variety of ways. For example, all or a portion of example systems 400 and 500 may represent portions of example systems 100, 200, and/or 300 in FIGS. 1-3. All or a portion of example systems 400 and 500 may also represent portions of systems 600 and 700 shown in FIGS. 6 and 7. As shown in FIG. 6, system 600 may include a user 602 and various data-generating and/or processing devices that are worn or held by user 602. For example, FIG. 6 illustrates a head-mounted display system 604, such as head-mounted display system 800 illustrated in FIGS. 8 and 9, worn on the head of user 602, a smart watch 606 worn on a wrist of user 602, a smart phone 608 held in a hand of user 602, and an auxiliary device 610 (e.g., an auxiliary processing or power device) worn around the waist of user 602. In some examples, head-mounted display system 604 may include a data source that generates data and may transmit the data to smart watch 606, smart phone 608, and/or auxiliary device 610 for processing via directional wireless links established between head-mounted display system 604, smart watch 606, smart phone 608, and/or auxiliary device 610. In these examples, smart watch 606, smart phone 608, and/or auxiliary device 610 may include a processor configured to process the data received from head-mounted display system 604 and may transmit a result of processing the data to head-mounted display system 604 via the directional wireless links established between head-mounted display system 604, smart watch 606, smart phone 608, and/or auxiliary device 610.

Figure 7:
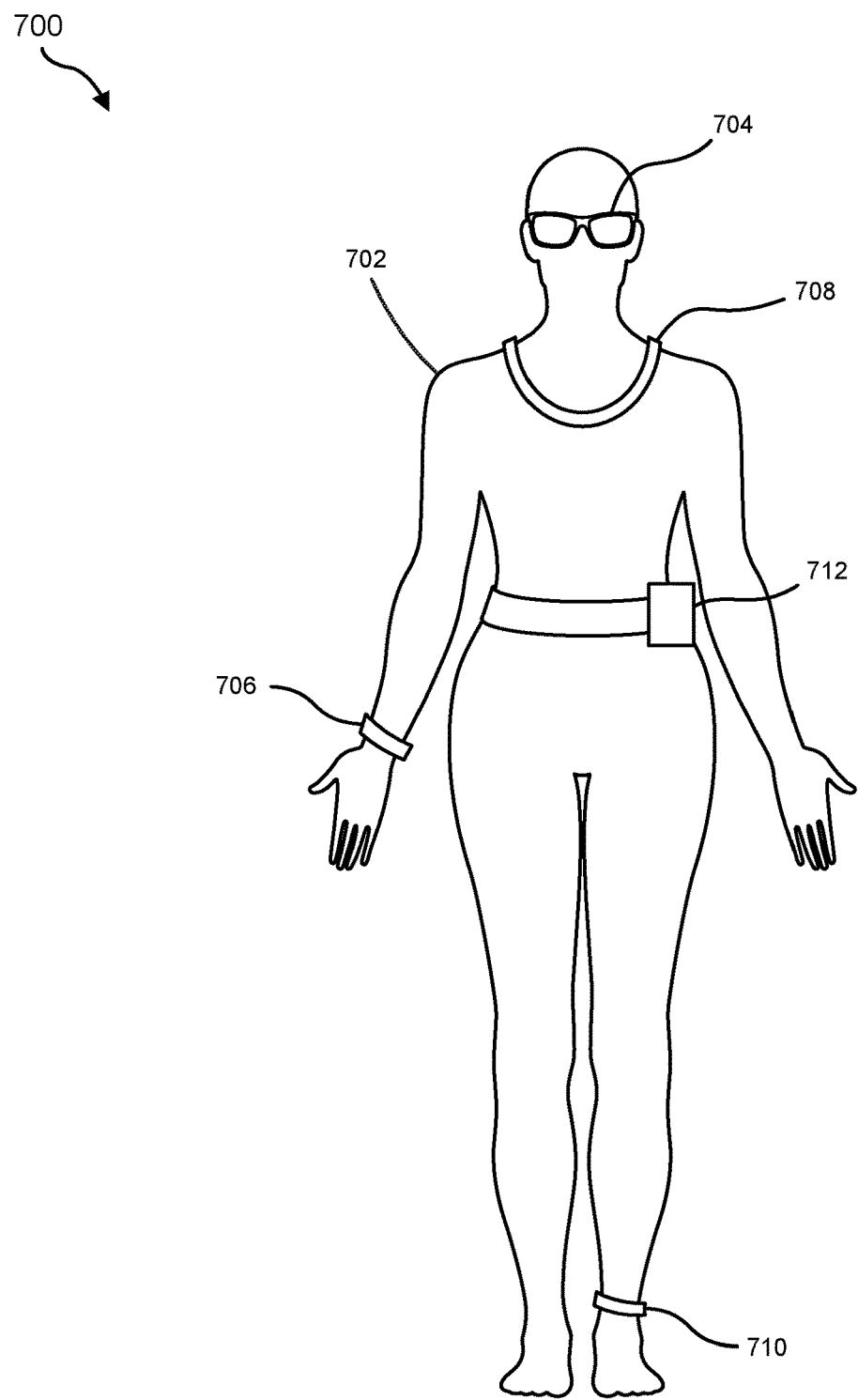
FIG. 7 is a front view of another user wearing components of another exemplary data-exchanging system in accordance with some embodiments.

As shown in FIG. 7, system 700 may include a user 702 and various data-and processing devices that are worn or held by user 702. For example, FIG. 7 illustrates a head-mounted display device 704, such as head-mounted display device 1000 illustrated in FIG. 10, worn on the head of user 702, an electronic device 706 worn on a wrist of user 702, an electronic device 708 worn about neck region of user 702, an electronic device 710 worn on an ankle of user 702, and an auxiliary device 712 (e.g., an auxiliary processing or power device) worn around the waist of user 702. In some examples, head-mounted display system 704 may include a data source that generates data and may transmit the data to electronic device 706, electronic device 708, electronic device 710, and/or auxiliary device 712 for processing via directional wireless links established between head-mounted display system 704, electronic device 706, electronic device 708, electronic device 710, and/or auxiliary device 712. In these examples, electronic device 706, electronic device 708, electronic device 710, and/or auxiliary device 712 may include a processor configured to process the data received from head-mounted display device 704 and may transmit a result of processing the data to head-mounted display system 704 via the directional wireless links established between head-mounted display system 704, electronic device 706, electronic device 708, electronic device 710, and/or auxiliary device 712.

Figure 8:
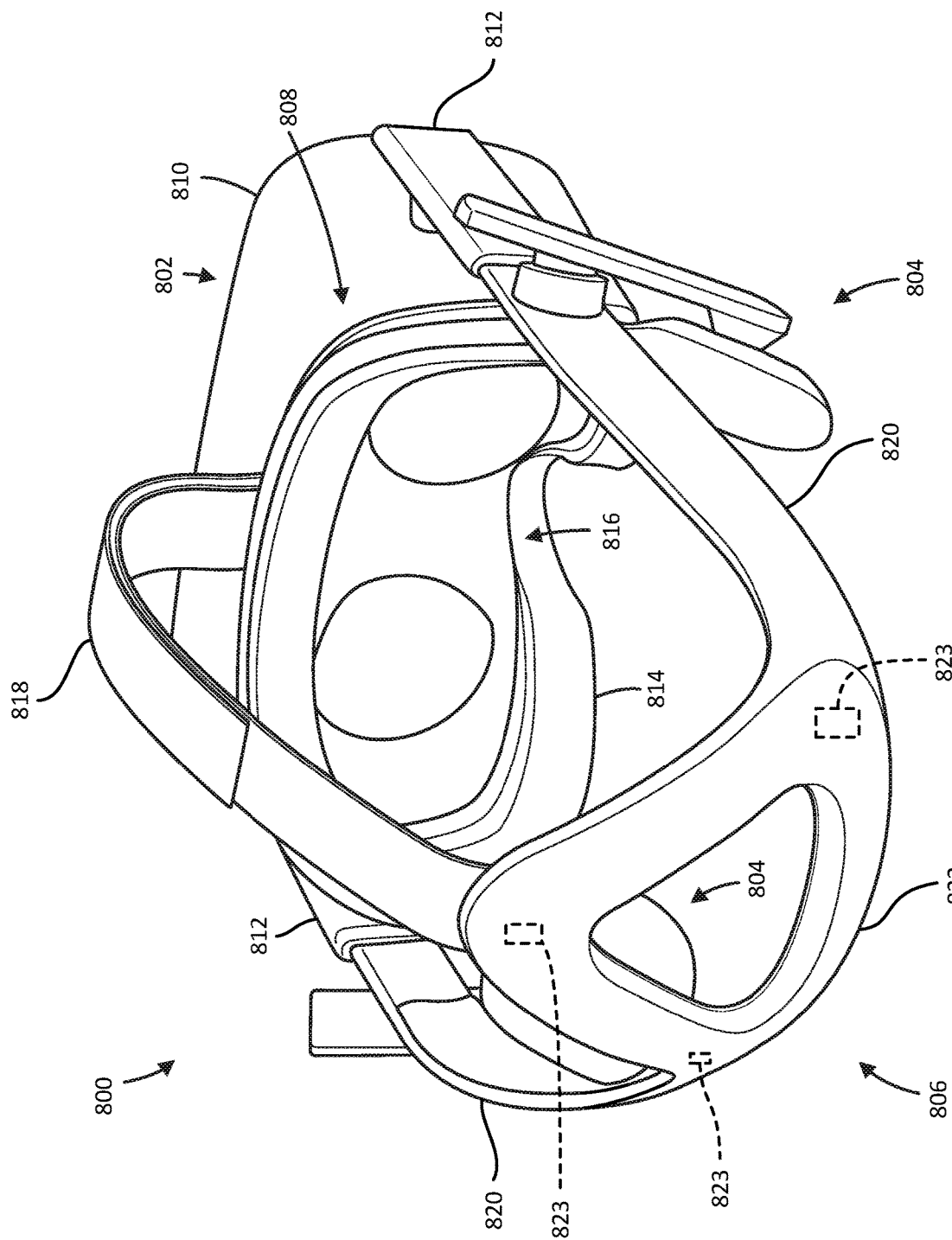
FIG. 8 is a perspective top view of an exemplary head-mounted display device in accordance with some embodiments.
Figure 9:
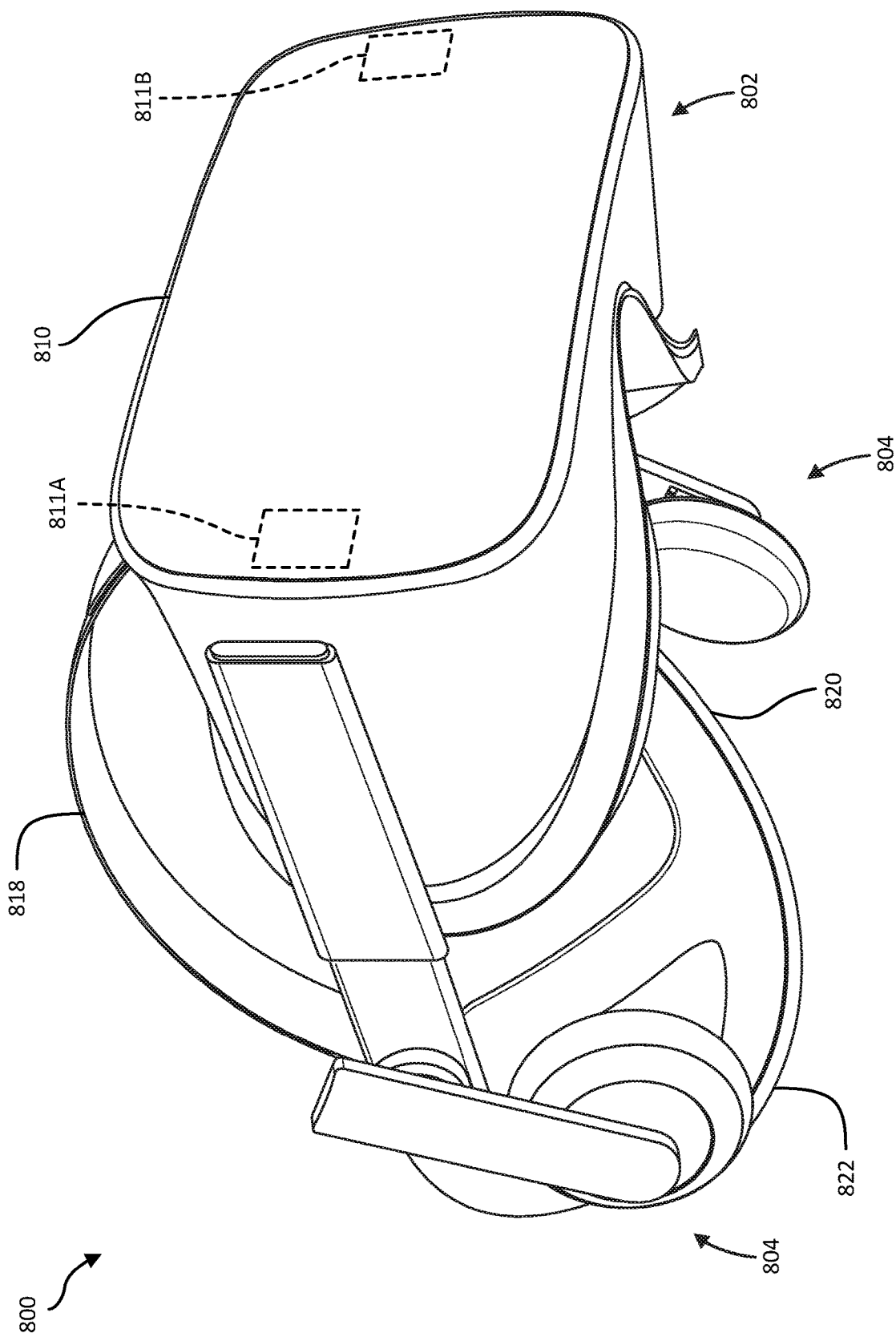
FIG. 9 is a perspective bottom view of the exemplary head-mounted display device illustrated in FIG. 8 in accordance with some embodiments.

FIGS. 8 and 9 are perspective views of a head-mounted display system 800 in accordance with some embodiments. Head-mounted display system 800 includes a head-mounted display device 802 (e.g., a head-mounted display), audio subsystems 804, a strap assembly 806, and a facial-interface subsystem 808. In some embodiments, the term "head-mounted display" may refer to any type or form of display device or system that is worn on or about a user's head and displays visual content to a user. Head-mounted displays may display content in any suitable manner, including via a screen (e.g., an LCD or LED screen), a projector, a cathode ray tube, an optical mixer, etc. Head-mounted displays may display content in one or more of various media formats. For example, a head-mounted display may display video, photos, and/or computer-generated imagery (CGI).

Head-mounted displays may provide diverse and distinctive user experiences. Some head-mounted displays may provide virtual-reality experiences (i.e., they may display computer-generated or pre-recorded content), while other head-mounted displays may provide real-world experiences (i.e., they may display live imagery from the physical world). Head-mounted displays may also provide any mixture of live and virtual content. For example, virtual content may be projected onto the physical world (e.g., via optical or video see-through), which may result in augmented reality or mixed reality experiences.

In some embodiments, head-mounted display device 802 may include an outer housing 810 that may surround, contain, and protect various display, optical, and other electronic components of head-mounted display device 802 (e.g., antenna arrays 811A and 811B). Outer housing 810 may be attached to strap assembly 806 by interfaces 812. Facial-interface subsystem 808 may be configured to comfortably rest against a region of a user's face, including a region surrounding the user's eyes, when head-mounted display system 800 is worn by the user. In these embodiments, facial-interface subsystem 808 may include a facial-interface cushion 814. Facial-interface cushion 814 may surround a viewing region 816 that includes the user's field of vision while the user is wearing head-mounted display system 800.

In some embodiments, strap assembly 806 may be used to mount head-mounted display device 802 on a user's head. As shown in FIG. 8, strap assembly 806 may include an upper strap 818 and lower straps 820. Lower straps 820 may each be coupled to one of strap interfaces 812, which are shown coupled to head-mounted display device 802. Strap assembly 806 may adjustably conform to the top and/or sides of a user's head when the user is wearing head-mounted display device 802. In some embodiments, strap assembly 806 may include a back piece 822 coupled with upper strap 818 and lower straps 820 to rest against the back of the user's head.

In some examples, antenna arrays capable of spatial selectivity (i.e., beamforming) may be incorporated into head-mounted display system 800. Antenna arrays may be incorporated into any suitable portion of head-mounted display device 802, audio subsystems 804, strap assembly 806, or facial-interface subsystem 808. As shown in FIG. 8, one or more antenna arrays 823 may be incorporated into back piece 822 of strap assembly 806. In some examples, one or more antenna arrays 811 may be incorporated into head-mounted display device 802 as shown in FIG. 9.

Figure 10:
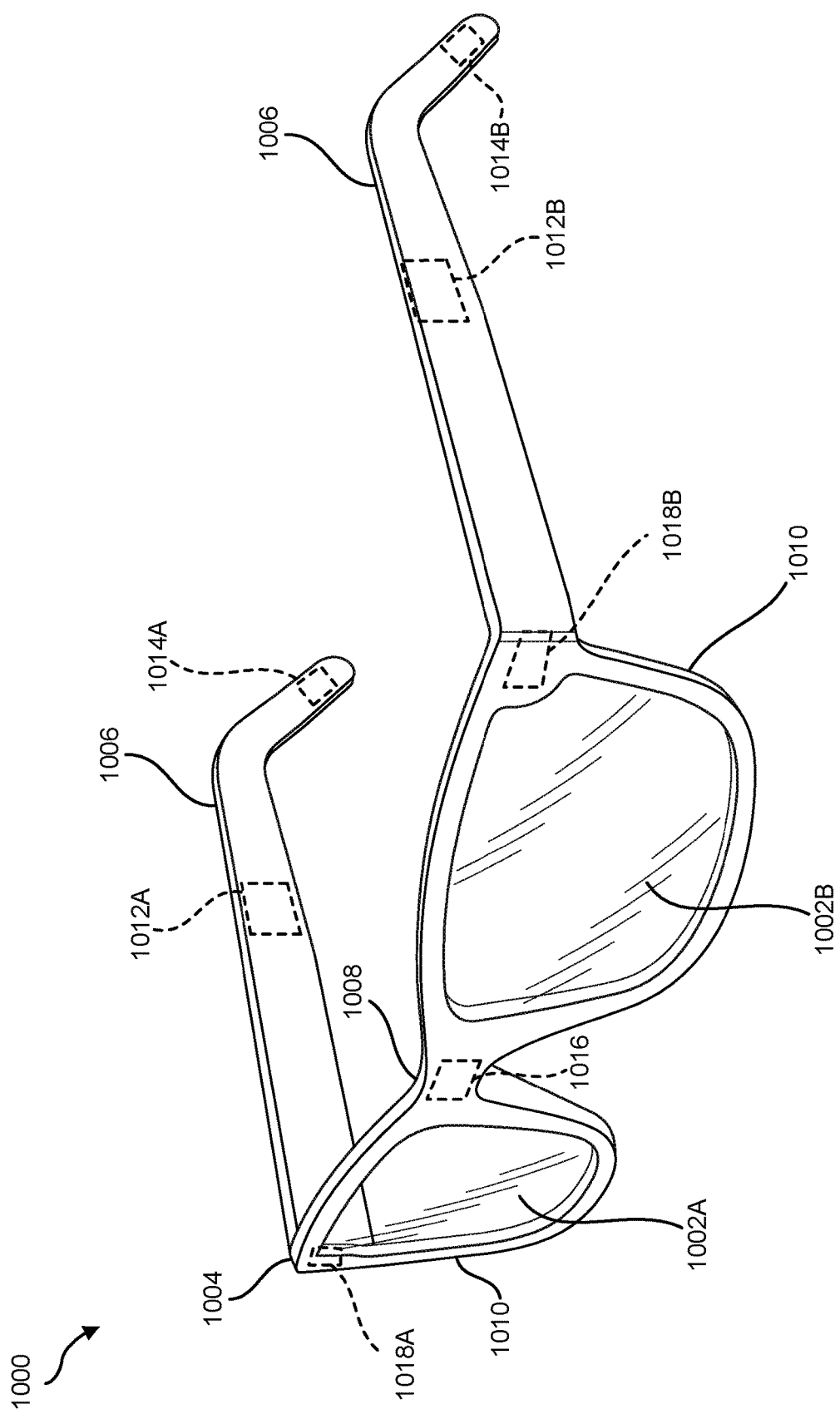
FIG. 10 is a perspective view of an exemplary head-mounted display device in accordance with some embodiments.

FIG. 10 is a diagram of a head-mounted display device 1000 according to some embodiments. The depicted embodiment includes a right near-eye display 1002A and a left near-eye display 1002B, which are collectively referred to as near-eye displays 1002. Near-eye displays 1002 may present media to a user. Examples of media presented by near-eye displays 1002 include one or more images, a series of images (e.g., a video), audio, or some combination thereof. Near-eye displays 1002 may be configured to operate as an AR near-eye display, such that a user can see media projected by near-eye displays 1002 and see the real-world environment through near-eye displays 1002. However, in some embodiments, near-eye displays 1002 may be modified to also operate as VR near-eye displays, MR near-eye displays, or some combination thereof. Accordingly, in some embodiments, near-eye displays 1002 may augment views of a physical, real-world environment with computer-generated elements (e.g., images, video, sound, etc.).

As shown in FIG. 10, head-mounted display device 1000 may include a support or frame 1004 that secures near-eye displays 1002 in place on the head of a user, in embodiments in which near-eye displays 1002 include separate left and right displays. In some embodiments, frame 1004 may be a frame of eye-wear glasses. Frame 1004 may include temples 1006 configured to rest on the top of and/or behind a user's ears, a bridge 1008 configured to rest on the top on the bridge of the user's nose, and rims 1010 sized and configured to rest on or against the user's cheeks. Antenna arrays capable of spatial selectivity may be incorporated into head-mounted display device 1000 at various locations. FIG. 10 illustrates exemplary placements of antenna arrays for head-mounted display device 1000. In this example, one or both of temples 1006 may include an antenna array 1012 and/or an antenna array 1014. In some examples, bridge 1008 may include an antenna array 1016, and/or rims 1010 may include one or more antenna arrays 1018.

Figure 11:
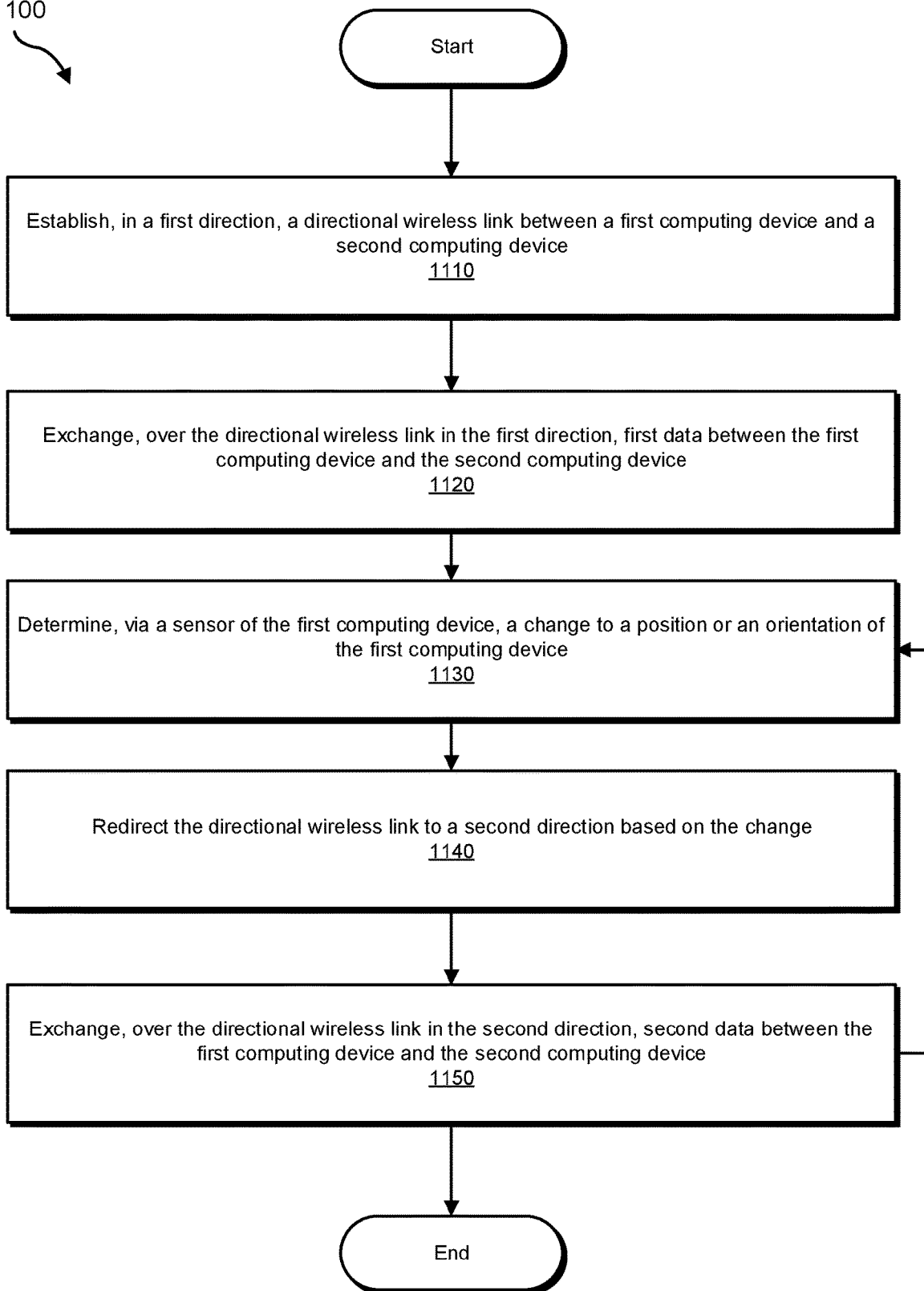
FIG. 11 is a flow diagram of an exemplary method for maintaining directional wireless links of motile computing devices in accordance with some embodiments.

FIG. 11 is a flow diagram of an example computer-implemented method 1100 for maintaining directional wireless links of motile computing devices. The steps shown in FIG. 11 may be performed by any suitable computer-executable code and/or computing system, including system 400 in FIG. 4, system 500 in FIG. 5, and/or variations or combinations of one or more of the same. In one example, each of the steps shown in FIG. 11 may represent an algorithm whose structure includes and/or is represented by multiple sub-steps, examples of which will be provided in greater detail below.

Figure 12:
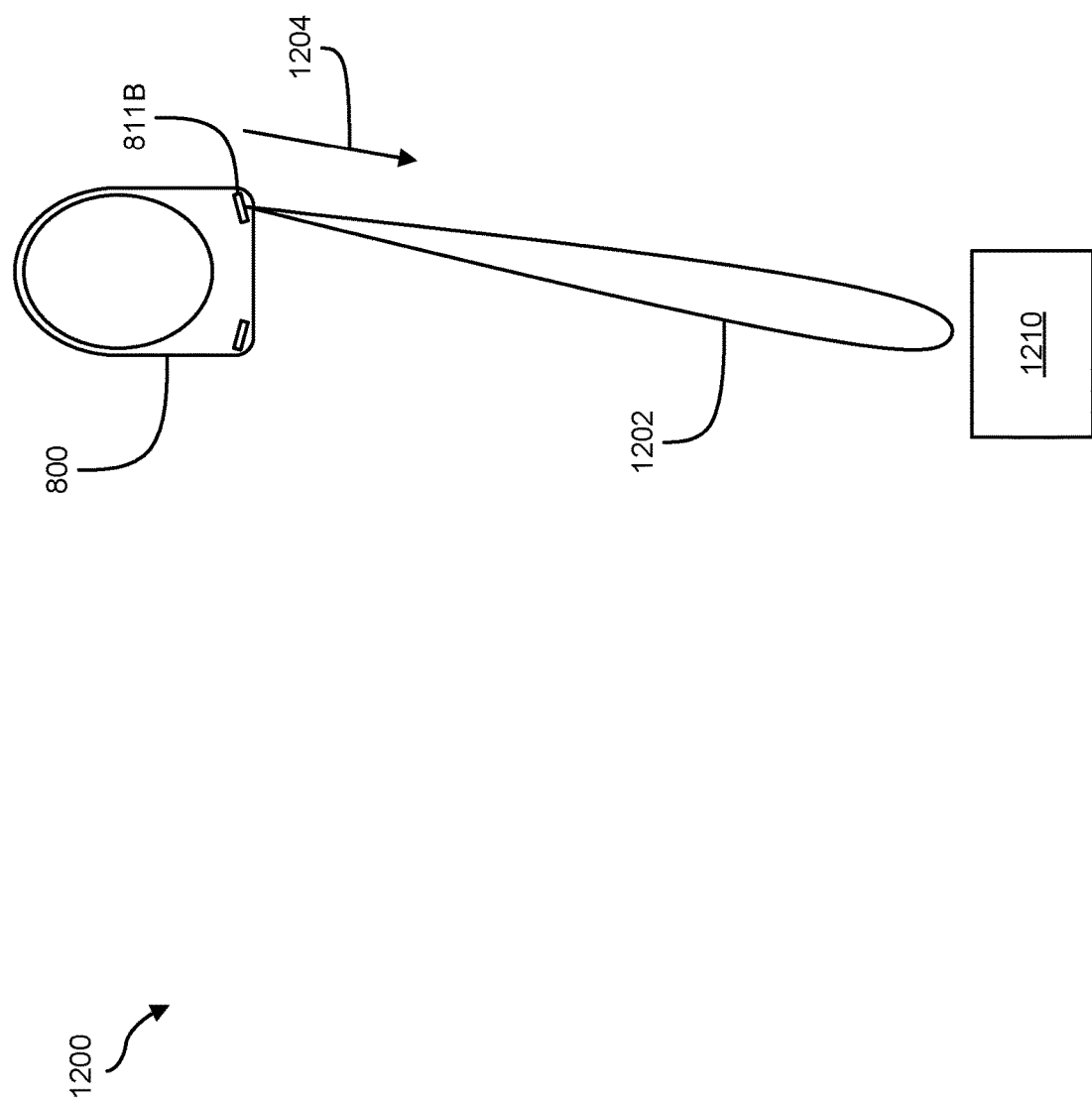
FIG. 12 is a top-down view of an exemplary directional wireless link between two computing devices in accordance with some embodiments.

As illustrated in FIG. 11, at step 1110 one or more of the systems described herein may establish a directional wireless link between a first computing device and a second computing device in a first direction. For example, establishing module 404 may, as part of directional communication subsystem 512 in FIG. 5, establish a directional wireless link between computing device 502 and computing device 506 by focusing a gain of antenna array 418A in a first direction (e.g., the initial direction of directional wireless signal 501 or directional wireless signal 503 relative to computing device 502). Similarly, establishing module 404 may, as part of directional communication subsystem 516 in FIG. 5, establish the directional wireless link between computing device 502 and computing device 506 by focusing a gain of antenna array 418B in a first direction (e.g., the initial direction of directional wireless signal 501 or directional wireless signal 503 relative to computing device 506). Using FIG. 12 as another example, establishing module 404 may, as part of head-mounted display system 800, establish a directional wireless link 1200 between head-mounted display system 800 and computing device 1210 by focusing a gain of antenna array 811B in a direction 1204 (e.g., the direction of main lobe 1202). In this example, main lobe 1202 may represent a main lobe of the radiation or receiving pattern of antenna array 811B.

In some examples, the systems described herein may establish a directional wireless link between two computing devices using any suitable beamforming protocol. In one example, the systems described herein may initialize a directional wireless link between two computing devices using a suitable sector-sweep operation (e.g., the sector-level sweep operation provided in the IEEE 0802.11ad protocol) that may roughly configure the directional gains of antenna arrays of the two computing devices. In some examples, after performing the initial sector-sweep operation, the systems described herein may further refine the directional wireless link between two computing devices using a suitable beam-refinement or beam-tracking operation (e.g., the beam-refinement operation provided in the IEEE 802.11ad protocol) that may refine the directional gains of antenna arrays of the two computing devices to maximize throughput of the directional wireless link.

At step 1120, one or more of the systems described herein may exchange, over the directional wireless link in the first direction, first data between the first computing device and the second computing device. For example, exchanging module 406 may, as part of directional communication system 512 and/or directional communication system 516, exchange data 508 over the directional wireless link established between computing devices 502 and 506. Using FIG. 12 as another example, exchanging module 406 may, as part of head-mounted display system 800, exchange data via directional wireless link 1200 in direction 1204.

The systems described herein may exchange data over a directional wireless link using any suitable data-transmission protocol. In at least one example, the systems described herein may, while exchanging data over a directional wireless link, refine the directional wireless link between two computing devices using a suitable beam-refinement or beam-tracking operation in order to maintain maximum throughput of the directional wireless link. In at least one example, the systems described herein may, while exchanging other data, exchange position and/or orientation sensor data over a directional wireless link. For example, exchanging module 406 may, as part of directional communication system 512, exchange position or orientation measurements acquired from sensor 414 or sensor subsystem 510 with computing device 506 over the directional wireless link established between computing devices 502 and 506.

At step 1130, one or more of the systems described herein may determine, via a sensor of the first computing device, a change to a position or an orientation of the first computing device. For example, determining module 408 may, as part of sensor subsystem 510 or directional communication subsystem 512 of computing device 502, determine, via data acquired from sensor 414 of computing device 502, a change to a position or an orientation of computing device 502. In another example, determining module 408 may, as part of directional communication subsystem 516 of computing device 506, determine, via data acquired from sensor 414 of computing device 502 and transmitted to computing device 506, a change to a position or an orientation of computing device 502. Using FIG. 13 as another example, determining module 408 may determine, via a sensor of head-mounted display system 800, a change 1300 to the yaw of head-mounted display system 800.

The systems described herein may monitor the position and/or orientation of a computing device in a variety of ways. In one example, the systems described herein may monitor changes to the pitch, the yaw, and/or the roll of the computing device. In other examples, the systems described herein may, for example as part of a head-mounted display system, monitor a pose of the head-mounted display system or a user of the head-mounted display system. In some examples, the systems described herein may monitor the position and/or orientation of a computing device as part of a SLAM subsystem, a head-tracking subsystem, or pose-tracking subsystem of a VR, MR, or AR system. Alternatively, the systems described herein may monitor the position and/or orientation of a computing device as part of a directional communication system. In one example, the directional communication system may monitor the position and/or orientation of the computing device by receiving position and/or orientation information from a SLAM subsystem, a head-tracking subsystem, or pose-tracking subsystem of a VR, MR, or AR system and/or by accessing the same sensors used by such SLAM, head-tracking, or pose-tracking subsystems.

At step 1140, one or more of the systems described herein may redirect, based on the change, the directional wireless link to a second direction. For example, redirecting module 410 may, as part of sensor subsystem 510 and/or directional communication subsystem 512, redirect the directional wireless link between computing devices 502 and 506 by refocusing the gain of antenna array 418A to a second direction (e.g., the direction of directional wireless signal 501 or directional wireless signal 503 relative to computing device 502 after the change detected at step 1130). Additionally or alternatively, redirecting module 410 may, as part of directional communication subsystem 516, redirect the directional wireless link between computing devices 502 and 506 by refocusing the gain of antenna array 418B to a second direction (e.g., the direction of directional wireless signal 501 or directional wireless signal 503 relative to computing device 506 after the change detected at step 1130). Using FIG. 13 as another example, redirecting module 410 may, as part of head-mounted display system 800, redirect directional wireless link 1200 between head-mounted display system 800 and computing device 1210 by refocusing the gain of antenna array 811B in a direction 1304 (e.g., the direction of main lobe 1302). In this example, main lobe 1302 may represent the reconfigured main lobe of the radiation or receiving pattern of antenna array 811B.

In general, the systems described herein may redirect a directional wireless link between two computing devices to compensate for changes in the position or orientation of one or more of the computing devices. In some examples, the systems described herein may redirect a directional wireless link as part of a directional communication system. In some examples, the systems described herein may redirect a directional wireless link between two computing devices based on changes in the position or orientation of the computing devices rather than using a sector-sweep operation. In some examples, redirecting a directional wireless link between two computing devices based on changes in the position or orientation of the computing devices may roughly reconfigure the directional gains of antenna arrays of the two computing devices. Thus, after redirecting the directional wireless link between two computing devices, the systems described herein may further refine the directional wireless link between the two computing devices using a suitable beam-refinement or beam-tracking operation (e.g., the beam-refinement operation provided in the IEEE 802.11ad protocol) that may further refine the directional gains of antenna arrays of the two computing devices to maximize throughput of the directional wireless link.

At step 1150, one or more of the systems described herein may exchange, over the directional wireless link in the second direction, second data between the first computing device and the second computing device. In general, the systems described herein may continually monitor changes to the position or orientation of a motile computing device while data is exchanged over a directional wireless link and, after detecting a change to the position or orientation of the motile computing device, redirect the directional wireless link accordingly.

In some examples, a motile computing device may include more than one antenna array. In such examples, each of the motile computing device's antenna arrays may have a different field of view. For example, as shown in FIG. 15, antenna array 811A of head-mounted display system 800 may have a field of view 1501 that overlaps a field of view 1503 of antenna array 811B. FIG. 14 is a flow diagram of an example computer-implemented method 1400 for maintaining directional wireless links of motile computing devices having more than one antenna array. The steps shown in FIG. 14 may be performed by any suitable computer-executable code and/or computing system, including system 400 in FIG. 4, system 500 in FIG. 5, and/or variations or combinations of one or more of the same. In one example, each of the steps shown in FIG. 14 may represent an algorithm whose structure includes and/or is represented by multiple sub-steps, examples of which will be provided in greater detail below.

As illustrated in FIG. 14, at step 1410, the systems described herein may establish, in a first direction, a directional wireless link between a first computing device and a second computing device by focusing a gain of a first antenna array of the first computing device in a first direction. Using FIG. 15 as an example, establishing module 404 may, as part of head-mounted display system 800, establish a directional wireless link 1500 between head-mounted display system 800 and computing device 1510 by focusing a gain of antenna array 811B in an initial direction (e.g., the direction of main lobe 1502). In this example, main lobe 1502 may represent a main lobe of the radiation or receiving pattern of antenna array 811B.

At step 1420, one or more of the systems described herein may exchange, over the directional wireless link in the first direction, first data between the first computing device and the second computing device. For example, exchanging module 406 may, as part of head-mounted display system 800, exchange data with computing device 1510 via directional wireless link 1500 in the direction shown in FIG. 15.

Figure 16:
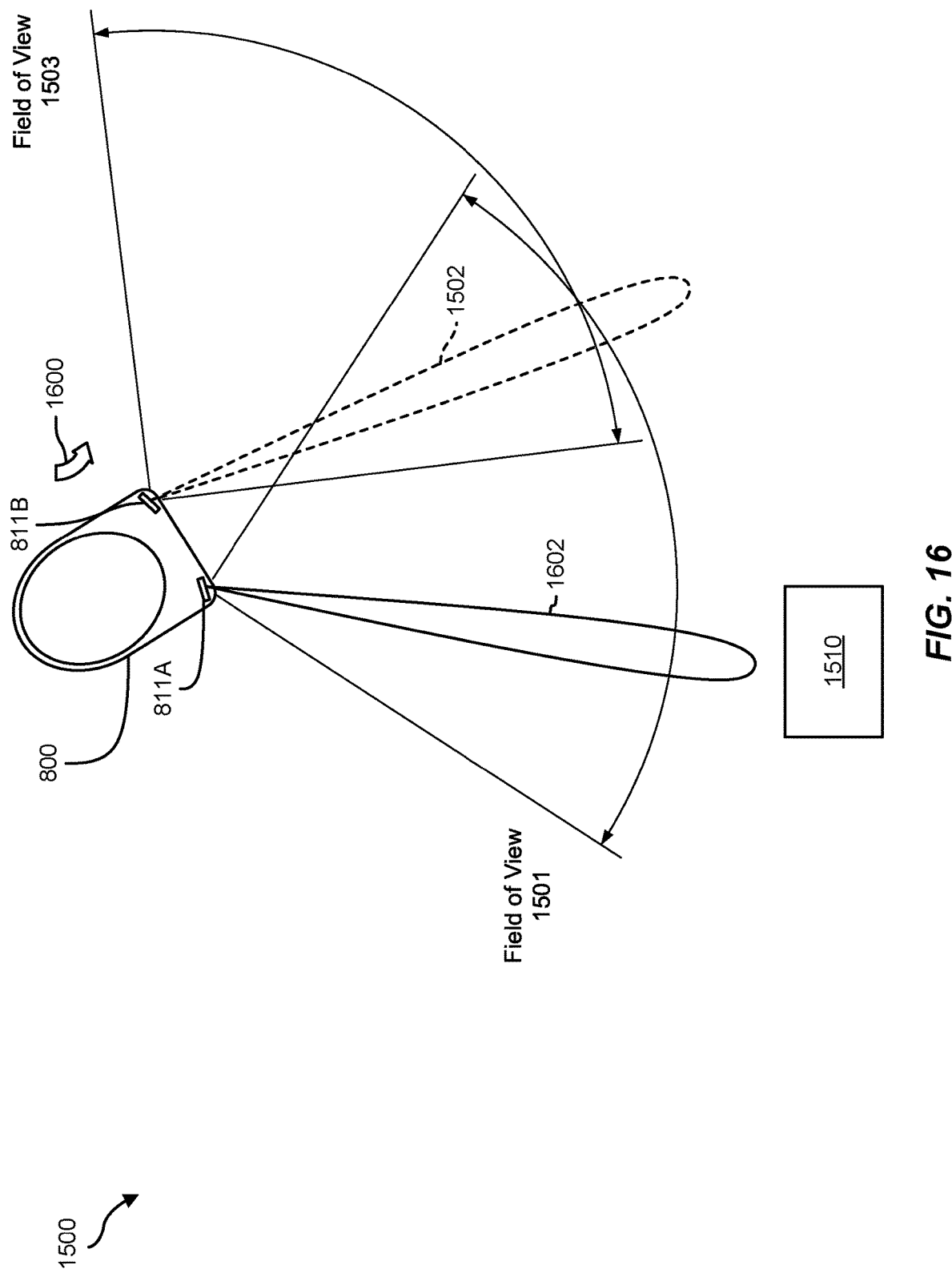
FIG. 16 is a top-down view of the exemplary directional wireless link illustrated in FIG. 15 after being refined based on an exemplary change in orientation of one of the two computing devices illustrated in FIG. 15 in accordance with some embodiments.

At step 1430, one or more of the systems described herein may determine that a change to the position or the orientation of the first computing device results in the signal path of the directional wireless link being outside of the first antenna array's field of view. Using FIG. 16 as an example, determining module 408 may determine, via a sensor of head-mounted display system 800, that a change 1600 to the yaw of head-mounted display system 800 results in the signal path of directional wireless link 1500 being outside of field of view 1503 of antenna array 811B.

At step 1440, one or more of the systems described herein may determine that the change to the position or the orientation of the first computing device results in the signal path of the directional wireless link being within the field of view of a second antenna array of the first computing device in a second direction. Using FIG. 16 as an example, determining module 408 may determine that change 1600 to the yaw of head-mounted display system 800 results in the signal path of directional wireless link 1500 being inside of field of view 1501 of antenna array 811A.

At step 1450, one or more of the systems described herein may redirect the directional wireless link to the second direction by focusing a gain of the second antenna array in the second direction. Using FIG. 16 as an example, redirecting module 410 may, as part of head-mounted display system 800, redirect directional wireless link 1500 between head-mounted display system 800 and computing device 1510 by refocusing the gain of antenna array 811A in a new direction (e.g., the direction of main lobe 1602). In this example, main lobe 1602 may represent a main lobe of the radiation or receiving pattern of antenna array 811A.

At step 1460, one or more of the systems described herein may exchange, over the directional wireless link in the second direction, second data between the first computing device and the second computing device. For example, exchanging module 406 may, as part of head-mounted display system 800, exchange data with computing device 1510 via directional wireless link 1500 in the direction shown in FIG. 16.

As explained above, embodiments of the instant disclosure may use sensor measurements of a motile computing device's position and/or orientation to steer a directional wireless beam established between the motile computing device and another motile or stationary computing device (e.g., a motile or stationary auxiliary computing device that performs computational tasks for the motile computing device). In some examples, embodiments of the instant disclosure may perform a full sector sweep to establish an initial directional wireless beam. Using position and/or orientation sensor measurements, embodiments of the instant disclosure may measure changes in the motile computing device's position and/or orientation (e.g., pitch, yaw, and roll) that may be used to adjust or refine the direction of the already established wireless beam. By reusing position and/or orientation measurements of a motile computing device's position and/or orientation to refine and adjust high-throughput directional wireless links of the motile computing device, embodiments of the instant disclosure may efficiently maintain the directional wireless links despite the movements of the motile computing device and the highly directional nature of the directional wireless links. Accordingly, the disclosed systems may improve existing directional wireless communication technologies when applied to motile computing devices such as VR and AR headsets.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive a measurement of a change to a position or an orientation of a first computing device that is communicating via a directional wireless link with a second computing device, transform the measurement into a directional adjustment to the directional wireless link, output a result of the transformation to a directional communication system managing the directional wireless link, and/or use the result of the transformation to adjust the direction of the directional wireless link in order to maintain the directional wireless link despite the change to the position or the orientation of the first computing device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   using a simultaneous localization and mapping sensor to determine a position and orientation of a first wearable device relative to a map of an environment of the first wearable device;
   performing a sector-sweep operation to detect a position within the environment of a signal path between the first wearable device and a second wearable device;
   focusing, by the first wearable device after performing the sector-sweep operation, a directional wireless beam of the first wearable device towards the position of the signal path within the environment;
   exchanging, by the first wearable device via the first wearable device's directional wireless beam focused towards the position of the signal path, first data with the second wearable device; and
   while refraining from performing the sector-sweep operation,
      continuously monitoring, by the first wearable device using the simultaneous localization and mapping sensor, a user's changes to the position or the orientation of the first wearable device within the map of the environment;
   using, by the first wearable device in response to each of the user's changes, the map of the environment to refocus the first wearable device's directional wireless beam towards the position of the signal path; and
   exchanging, by the first wearable device via the first wearable device's directional wireless beam refocused towards the position of the signal path, second data with the second wearable device.

2. The computer-implemented method of claim 1, wherein:
   the first wearable device comprises a data source that generates the first data;
   the user's changes to the position or the orientation of the first wearable device are caused by movements of the user's body;
   the second wearable device is an auxiliary processing device; and
   the second data is a result of the auxiliary processing device processing the first data.

3. The computer-implemented method of claim 2, wherein the auxiliary processing device is a smart watch worn by the user.

4. The computer-implemented method of claim 1, wherein:
   the first wearable device comprises at least one forward-facing antenna array capable of spatial selectivity;
   focusing the first wearable device's directional wireless beam towards the position of the signal path within the environment comprises focusing a gain of the first wearable device's forward-facing antenna array towards the position of the signal path within the map of the environment; and
   refocusing the first wearable device's directional wireless beam comprises refocusing the gain of the first wearable device's forward-facing antenna array towards the position of the signal path within the map of the environment.

5. The computer-implemented method of claim 1, wherein:
   the first wearable device comprises a strap assembly;
   the strap assembly comprises at least one antenna array capable of spatial selectivity;
   focusing the first wearable device's directional wireless beam towards the position of the signal path within the environment comprises focusing a gain of the strap assembly's antenna array towards the position of the signal path within the environment; and
   refocusing the first wearable device's directional wireless beam comprises refocusing the gain of the strap assembly's antenna array towards the position of the signal path within the map of the environment.

6. The computer-implemented method of claim 1, wherein:
   the first wearable device comprises at least one rearward-facing antenna array capable of spatial selectivity;

focusing the first wearable device's directional wireless beam towards the position of the signal path within the environment comprises focusing a gain of the first wearable device's rearward-facing antenna array towards the position of the signal path within the environment; and refocusing the first wearable device's directional wireless beam comprises focusing the gain of the first wearable device's rearward-facing antenna array towards the position of the signal path within the map of the environment.

7. The computer-implemented method of claim 1, wherein:
the first wearable device comprises:
a first antenna array capable of spatial selectivity; and
a second antenna array capable of spatial selectivity, wherein the first antenna array's field of view is different than the second antenna array's field of view;
focusing the first wearable device's directional wireless beam towards the position of the signal path within the environment comprises focusing a gain of the first wearable device's first antenna array towards the position of the signal path within the environment; and
refocusing the first wearable device's directional wireless beam towards the position of the signal path comprises:
determining that the user's change results in the position of the signal path within the map of the environment being outside of the first wearable device's first antenna array's field of view;
determining that the user's change results in the position of the signal path within the map of the environment being within the first wearable device's second antenna array's field of view; and
focusing the gain of the first wearable device's second antenna array towards the position of the signal path within the map of the environment.

8. The computer-implemented method of claim 1, wherein the first and second wearable devices are both head-mounted display devices.

9. The computer-implemented method of claim 1, wherein:
the second wearable device comprises at least one antenna array capable of spatial selectivity;
the computer-implemented method further comprises:
using an additional simultaneous localization and mapping sensor to determine a position and orientation of the second wearable device relative to an additional map of the environment of the first wearable device;
focusing, by the second wearable device, a gain of the antenna array along the signal path;
receiving, from the first wearable device at the second wearable device, an indication of a change to the position or the orientation of the first wearable device; and
using, by the second wearable device, the additional map of the environment to refocus the gain of the antenna array to compensate for the change.

10. The computer-implemented method of claim 1, wherein the first wearable device's directional wireless beam is focused towards the position of the signal path within the environment as part of performing the sector-sweep operation.

11. A wearable computing device comprising:
at least one antenna array capable of spatial selectivity;
a data source that generates first data;
a simultaneous localization and mapping sensor;
a sensor subsystem configured to:

use the simultaneous localization and mapping sensor to determine a position and orientation of the wearable computing device relative to a map of an environment of the wearable computing device;
use the simultaneous localization and mapping sensor to continuously measure how a wearer changes the position or the orientation of the wearable computing device;
a directional-communication subsystem configured to:
perform a sector-sweep operation to detect a position within the map of the environment of a signal path between the wearable device and an additional wearable device;
focus a directional wireless beam of the at least one antenna array of the wearable computing device towards the position of the signal path;
transmit, via the at least one antenna array focused towards the position of the signal path, the first data to the additional wearable device;
use the map of the environment to refocus, in response to each of the wearer's changes to the position or the orientation of the wearable computing device, the directional wireless beam of the at least one antenna array of the wearable computing device towards the position of the signal path and
receive, via the directional wireless beam of the at least one antenna array of the wearable computing device, second data from the additional wearable device; and
an output device for displaying the second data to the wearer.

12. The wearable computing device of claim 11, wherein:
the wearable computing device is a head-mounted display device; and
the output device is a display.

13. The wearable computing device of claim 11, wherein:
the simultaneous localization and mapping subsystem comprises a plurality of video cameras;
the sensor subsystem is configured to use the plurality of video cameras to:
continuously update thee map of the environment; and
continuously update the position of the wearable computing device within the map of the environment; and
the map of the environment and the position of the wearable computing device within the map of the environment are:
used to display, via the output device, an immersive three-dimensional environment to the wearer; and
reused to refocus the wearable computing device's directional wireless beam.

14. The wearable computing device of claim 11, further comprising a strap assembly, wherein the at least one antenna array is integrated into the strap assembly.

15. The wearable computing device of claim 11, wherein the sensor subsystem is further configured to transmit an indication of the wearer's changes to the position or the orientation of the wearable computing device to the directional-communication subsystem.

16. The wearable computing device of claim 11, wherein the directional-communication subsystem is configured to:
focus the wearable computing device's directional wireless beam by focusing a gain of the antenna array towards the position of the signal path within the environment; and refocus the wearable computing device's directional wireless beam by focusing the gain of the antenna array towards the position of the signal path within the map of the environment.

17. The wearable computing device of claim 11, wherein:
the at least one antenna array of the wearable computing device comprises:
a first antenna array capable of spatial selectivity; and
a second antenna array capable of spatial selectivity;
the first antenna array's field of view is different than the second antenna array's field of view; and
the directional-communication subsystem is configured to:
focus the wearable computing device's directional wireless beam by focusing a gain of the wearable computing device's first antenna array towards the position of the signal path within the environment; and
refocus the wearable computing device's directional wireless beam by:
determining that the wearer's change to the position or the orientation of the wearable computing device results in the position of the signal path within the map of the environment being outside of the first antenna array's field of view;
determining that the wearer's change to the position or the orientation of the wearable computing device results in the position of the signal path within the map of the environment being within the wearable computing device's second antenna array's field of view; and
focusing the gain of the wearable computing device's second antenna array towards the position of the signal path within the map of the environment.

18. The wearable computing device of claim 11, wherein the directional wireless beam utilizes a 60-gigahertz radio frequency band.

19. A system comprising:
a wearable device comprising:
at least one antenna array capable of spatial selectivity;
a data source that generates first data;
a simultaneous localization and mapping sensor;
a sensor subsystem configured to:
use the simultaneous localization and mapping sensor to determine a position and orientation of the wearable device relative to a map of an environment of the wearable device;
use the simultaneous localization and mapping sensor to continuously measure changes, caused by a wearer, to the position or the orientation of the wearable device;
a directional-communication subsystem configured to:
perform a sector-sweep operation to detect a position within the environment of a signal path between the wearable device and an auxiliary processing device;
focus a directional wireless beam of the at least one antenna array of the wearable device towards the position of the signal path;
transmit, over the at least one antenna array focused towards the position of the signal path, the first data from the wearable device to the auxiliary processing device;
use the map of the environment to refocus, in response to each of the wearer's changes to the position or the orientation of the wearable device, the directional wireless beam of the at least one antenna array of the wearable device towards the position of the signal path; and
receive, over the at least one antenna array refocused towards the position of the signal path, second data from the auxiliary processing device; and
an output device for displaying the second data to the wearer; and
the auxiliary processing device configured to:
receive the first data from the had mounted display-wearable device;
generate the second data by processing the first data; and
transmit the second data to the wearable device.

20. The system of claim 19, wherein the auxiliary processing device is a second wearable device worn by the wearer.

* * * * *